(12) United States Patent
Noguchi et al.

(10) Patent No.: US 10,214,124 B2
(45) Date of Patent: Feb. 26, 2019

(54) SEAT LOCK APPARATUS

(71) Applicant: MITSUI KINZOKU ACT CORPORATION, Kanagawa (JP)

(72) Inventors: Katsunori Noguchi, Kanagawa (JP); Makoto Kondo, Kanagawa (JP); Hidemasa Hirakui, Kanagawa (JP); Junichi Shimada, Kanagawa (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 0 days.

(21) Appl. No.: 15/938,978

(22) Filed: Mar. 28, 2018

(65) Prior Publication Data
US 2018/0345829 A1 Dec. 6, 2018

(30) Foreign Application Priority Data

May 30, 2017 (JP) .................. 2017-107109

(51) Int. Cl.
*B60N 2/36* (2006.01)
*B60N 2/433* (2006.01)
(Continued)

(52) U.S. Cl.
CPC ......... *B60N 2/433* (2013.01); *B60N 2/01541* (2013.01); *B60N 2/20* (2013.01);
(Continued)

(58) Field of Classification Search
CPC .. B60N 2/2245; B60N 2/01541; B60N 2/366; B60N 2/433
See application file for complete search history.

(56) References Cited

U.S. PATENT DOCUMENTS 6,945,585 B1 * 9/2005 Liu ................ B60N 2/01583
                                                292/216
7,032,973 B2 * 4/2006 Reubeuze ......... B60N 2/01541
                                                292/121
(Continued)

FOREIGN PATENT DOCUMENTS

CA           2347958 A1 *  3/2001  ............ B60N 2/366
DE    102006058151 B3 * 12/2007  ............ B60N 2/366
(Continued)

OTHER PUBLICATIONS

Extended European Search Report dated Nov. 9, 2018, issued in corresponding European Patent Application No. 18166777.

*Primary Examiner* — Timothy J Brindley
(74) *Attorney, Agent, or Firm* — McDermott Will & Emery LLP

(57) ABSTRACT

A seat lock apparatus includes: a hook member configured to be rotationally biased elastically in a positive direction; an interlocking unit configured to restrict rotation of the hook member in a negative direction; and a cover member configured to cover an operation range of the hook member at one side of the hook member, the cover member including a striker entrance groove that a striker enters. The hook member includes an engagement groove. The engagement groove has both end portions at a side of an opening of the engagement groove, each end portion being beyond the striker entrance groove to overlap the cover member as viewed along a shaft direction of the hook member when the hook member is at a position of being restricted from operating by the interlocking unit.

10 Claims, 23 Drawing Sheets

(51) Int. Cl.
  *B60N 2/22* (2006.01)
  *B60N 2/015* (2006.01)
  *B60N 2/42* (2006.01)
  *B60N 2/20* (2006.01)

(52) U.S. Cl.
  CPC ........... *B60N 2/2245* (2013.01); *B60N 2/366* (2013.01); *B60N 2/4221* (2013.01)

(56) References Cited

U.S. PATENT DOCUMENTS

| | | | | |
|---|---|---|---|---|
| 7,044,552 B2 * | 5/2006 | Muller | ............... | B60N 2/01583 296/65.03 |
| 7,404,605 B2 * | 7/2008 | Inoue | ..................... | B60N 2/224 296/65.16 |
| 7,954,898 B2 * | 6/2011 | Van De Geer | ..... | B60N 2/01583 292/200 |
| 7,959,205 B2 * | 6/2011 | Paing | ................. | B60N 2/01583 296/65.03 |
| 8,118,342 B2 * | 2/2012 | Kokubo | ............... | B60N 2/2245 296/65.16 |
| 8,128,135 B2 * | 3/2012 | Maeta | ................ | B60N 2/01583 292/201 |
| 8,708,377 B2 * | 4/2014 | Ishikawa | ............ | B60N 2/01583 292/216 |
| 8,851,548 B2 * | 10/2014 | Pacolt | ................ | B60N 2/01583 296/65.03 |
| 8,939,511 B2 * | 1/2015 | Majima | .................. | B60N 2/366 296/65.16 |
| 9,248,760 B2 * | 2/2016 | Boy | ..................... | B60N 2/2245 |
| 9,616,779 B2 * | 4/2017 | Barzen | ................ | B60N 2/2222 |
| 9,637,027 B2 * | 5/2017 | Seigel | ................ | B60N 2/01583 |
| 9,994,129 B1 * | 6/2018 | Shirokane | ........... | B60N 2/2245 |
| 2004/0066077 A1 * | 4/2004 | Petry | .................... | B60N 2/1615 297/367 R |
| 2006/0170270 A1 * | 8/2006 | Inoue | ................... | B60N 2/3009 297/378.12 |

FOREIGN PATENT DOCUMENTS

| | | | | |
|---|---|---|---|---|
| DE | 202011100040 U1 * | 8/2011 | ............. | B60N 2/366 |
| DE | 102014112031 A1 * | 2/2016 | ................ | B60N 2/20 |
| GB | 2485641 A | 5/2012 | | |
| JP | 2011-057220 A | 3/2011 | | |
| JP | 4847901 B2 | 12/2011 | | |
| JP | 2015-116958 A | 6/2015 | | |
| WO | WO-2005037596 A2 * | 4/2005 | ......... | B60N 2/01541 |

* cited by examiner

SEAT LOCK APPARATUS

CROSS-REFERENCE TO RELATED APPLICATION

The present application claims priority to and incorporates by reference the entire contents of Japanese Patent Application No. 2017-107109 filed in Japan on May 30, 2017.

BACKGROUND

1. Technical Field

The disclosure relates to a seat lock apparatus.

2. Related Art

A seat of a vehicle includes a seat cushion, which is a seating face, and a seat back, which is a backrest, and this seat back is elevation-switchable between a standing posture for normal seating and a sidelong lying posture of being laid down forward for convenience of loading. In the standing posture for seating, the seat back is configured to be retained and stabilized in a locked state by engagement of a seat lock apparatus provided in the seat back with a striker fixed to a main body of the vehicle. Further, there are some back seats that are able to be switched over in two steps in their standing posture, by internal mechanisms of seat lock apparatuses therein.

For example, according to an invention described in Japanese Patent No. 4847901, as illustrated in FIG. 15, a seat back is locked by engagement of an engagement groove 504 of a hook member 502, which is rotationally biased elastically inside a seat lock apparatus 500, with a striker 506, and the engagement between the hook member 502 and the striker 506 is released by an operation on an open lever 508. The engagement groove 504 is a groove interposed between a first angular portion 504a and a second angular portion 504b.

A seat lock apparatus installed in a vehicle may receive vibration or impact, and even if that happens, the engaged state between the hook member and the striker is desirably maintained. Therefore, the invention described in the Japanese patent includes an interlocking function of limiting rotation of the hook member 502 due to vibration or impact, by engagement of a projection 512 of the hook member 502 with an L-shaped groove portion 510 provided in the open lever 508. Illustrated in FIG. 15 is a state where this interlocking function has acted. The seat lock apparatus 500 has a cover 514, and a striker entrance groove 516 that the striker 506 enters is provided in the cover 514.

When a vehicle suddenly decelerates, luggage in a luggage space therein may collide with a rear surface of a seat back of a rear seat, and thus luggage space partition wall strength tests supposing such collision of luggage are carried out for seat backs. As illustrated in FIG. 16, in such a case, if it is supposed that luggage W collides with the rear seat substantially at the center of the rear seat, a load F acting on the seat lock apparatus 500 that is locking the seat back is generally in a diagonally rearward direction of the vehicle. The seat lock apparatus 500 is essentially an apparatus that locks the striker 506 with respect to a front-rear direction of the vehicle, and desirably has sufficient strength such that the striker 506 does not come out from the engagement groove 504 in consideration for prevention of large displacement of the seat back against a large force in a width direction of the vehicle.

In the above described seat lock apparatus 500, if the load F is excessive, the load F acts on the seat lock apparatus 500 in a rearward direction, and outward in the width direction of the vehicle, and may cause the first angular portion 504a and the second angular portion 504b that are in engagement with the striker 506 to be displaced in the width direction of the vehicle and to approach or come into contact with the cover 514. Further, if the load F is excessive, the seat lock apparatus 500 may be, as illustrated in FIG. 15, in an interlocked state where the hook member 502 has rotated a little, and the first angular portion 504a and the second angular portion 504b are present near a height of the striker entrance groove 516 in a side view thereof.

When the hook member 502 is displaced laterally together with the striker 506 in this interlocked state, the second angular portion 504b may slightly come into contact with an end portion of the cover 514, but there is no restriction member that limits displacement of the first angular portion 504a that is at a position of the striker entrance groove 516. Just with the slight contact of only the second angular portion 504b with the end portion of the cover 514, there is concern that stress exerted on that contacted portion may become excessive and either the second angular portion 504b or the cover 514 may be damaged.

Further, at that time, a distal end 508a of the open lever 508 may come into contact with the end portion of the cover 514, but since the open lever 508 does not have sufficient strength and the hook member 502 is interposed between the open lever 508 and the cover 514, there is a distance therebetween corresponding to a plate thickness of the hook member 502, considerable deformation is caused for the distal end 508a to come into contact with the cover 514, and thus there is concern that an area of the contact may become small and a component force outward along the width direction of the vehicle (hereinafter, also referred to as a lateral load) due to the load F may be unable to be supported sufficiently. Therefore, for the lateral load in the interlocked state to be infallibly held in the seat lock apparatus 500, strength of the hook member 502, the open lever 508, and the cover 514 must be made considerably high, and this becomes a main cause of increase in weight, increase in size, and increase in cost of the seat lock apparatus 500.

SUMMARY

In some embodiments, a seat lock apparatus includes: a hook member configured to be rotationally biased elastically in a positive direction; an interlocking unit configured to restrict rotation of the hook member in a negative direction; and a cover member configured to cover an operation range of the hook member at one side of the hook member, the cover member including a striker entrance groove that a striker enters. The hook member includes: a support shaft provided near one end of the hook member; an inclined hook edge face provided at another end of the hook member, and configured to be rotationally biased in the negative direction by the entering striker coming into contact with the inclined hook edge face; and an engagement groove that has a depth enabling the hook member to be in a locked position by the entering striker fitting into the depth after overriding the inclined hook edge face. The interlocking unit is configured to be switched over: to a restricting position of restricting the rotation of the hook member in the negative direction when the hook member is in engagement with the striker and is in the locked position; and to an allowing position of allowing the rotation of the hook member in the negative direction when the striker enters and when an engagement releasing operation for the striker has been performed. The engagement groove has both end portions at a side of an opening of the engagement groove, each end portion being beyond the striker entrance groove to overlap the cover member as viewed along a shaft direction of the hook member when the hook member is at a position of being restricted from operating by the interlocking unit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment of a seat lock apparatus according to the disclosure will be described in detail, based on the drawings. The disclosure is not limited by this embodiment.

Figure 1:
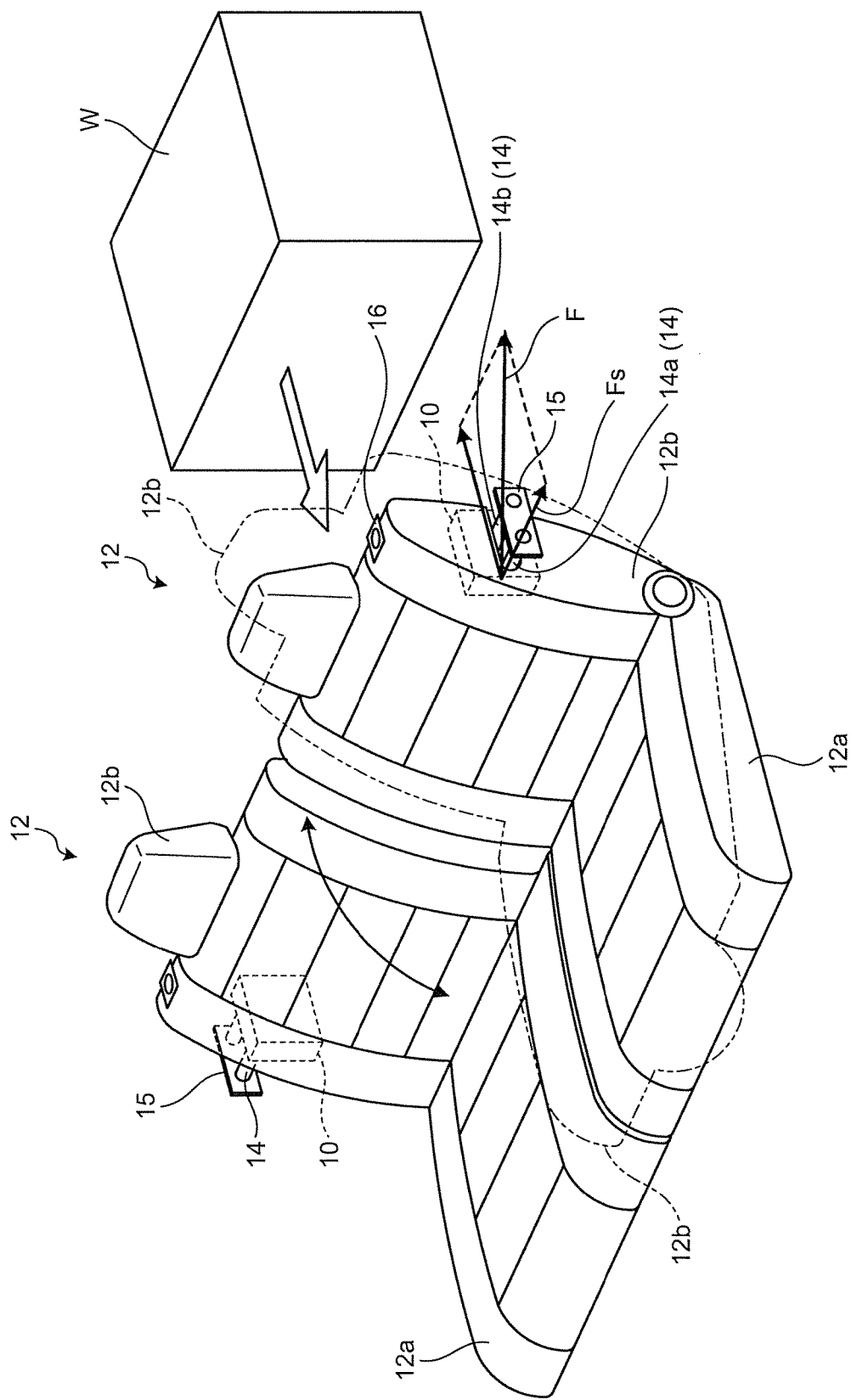
FIG. 1 is a schematic diagram illustrating a seat, to which a seat lock apparatus is applied.

As illustrated in FIG. 1, a seat lock apparatus 10 according to this embodiment is applied to a seat 12 of a vehicle. The seat 12 includes a seat cushion 12a, which is a seating face, and a seat back 12b, which is a backrest, and this seat back 12b is elevation-switchable between a standing posture for normal seating and a sidelong lying posture of being laid down forward for convenience of loading. Further, as to the standing posture, the seat back 12b is able to be switched over in two steps between a standard standing posture and a deeper standing posture (hereinafter, referred to as an inclined standing posture) by an internal mechanism of the seat lock apparatus 10. In FIG. 1, the standard standing posture of the seat back 12b is illustrated with a solid line, and the sidelong lying posture and the inclined standing posture with an imaginary line.

The seat 12 is, for example, a rear seat of the vehicle, two of these seats 12 are arranged side by side, and a luggage space is provided at the rear of these seats 12. Luggage W is loaded in the luggage space, and when the vehicle suddenly decelerates, the luggage W may collide with the approximate center of the two seats 12. Upon this collision, a load F acting on the seat lock apparatus 10 is generally in a diagonally rearward direction of the vehicle, and not only a component force in a rearward direction, but also a lateral load Fs that is a component force outward along a width direction of the vehicle acts thereon. In the description hereinafter, the seat 12 on the left side (the near side in FIG. 1) of the vehicle and the seat lock apparatus 10 inside that seat 12 will be described as an example, but the seat 12 on the right side also has similar action and effects bilaterally symmetrically or approximately bilaterally symmetrically thereto.

The seat lock apparatus 10 is provided inside the seat back 12b a little below a shoulder portion of the seat back 12b, and is able to lock the seat back 12b in two standing postures by engaging with a first striker 14a or second striker 14b, which is fixed to a vehicle body panel side and is made of metal. Further, by release of the engagement between the seat lock apparatus 10 and the first striker 14a and second striker 14b, the seat back 12b is able to be laid down into the sidelong lying posture.

The first striker 14a and the second striker 14b are arranged side by side and away from each other by a prescribed distance. The first striker 14a and the second striker 14b are connected to one another at distal ends thereof form a rectangle having an opening at one side thereof, and are fixed to a striker base 15 at the opening side thereof. The first striker 14a or the second striker 14b will also be representatively called a striker 14.

By the seat back 12b being lifted up from the sidelong lying posture, the first striker 14a firstly engages with the seat lock apparatus 10 and the standard standing posture is taken. Subsequently, by a pull-up operation on an operation knob (operation portion) 16 provided in the shoulder portion of the seat back 12b, the engagement between the seat lock apparatus 10 and the first striker 14a is released; and by the seat back 12b being laid down more deeply, the second striker 14b engages with the seat lock apparatus 10 and the seat back 12b is locked in the inclined standing posture, or by the seat back 12b being laid down forward again, the seat back 12b is returned to the sidelong lying posture. The engagement in the inclined standing posture is also released by a pull-up operation on the operation knob 16.

Next, before detailed description of the seat lock apparatus 10, four main parts of the seat lock apparatus 10, that is, a hook member 20, a cam plate (interlocking unit) 50, a sensing lever 70, and an open lever 100, will be described first while reference is made to FIG. 2 to FIG. 5. Although perspective views of these parts are illustrated in FIG. 2 to FIG. 5, these illustrate states as viewed from substantially the same direction as that in FIG. 6, which is a side view. Further, in the following description, a clockwise rotating direction will be defined as a positive direction and an anticlockwise rotating direction will be defined as a negative direction, when the seat lock apparatus 10 is viewed from one side thereof as illustrated in FIG. 6. Further, for convenience of explanation, based on the state illustrated in FIG. 6, "up", "down", "left", and "right" will be referred to.

Figure 2:
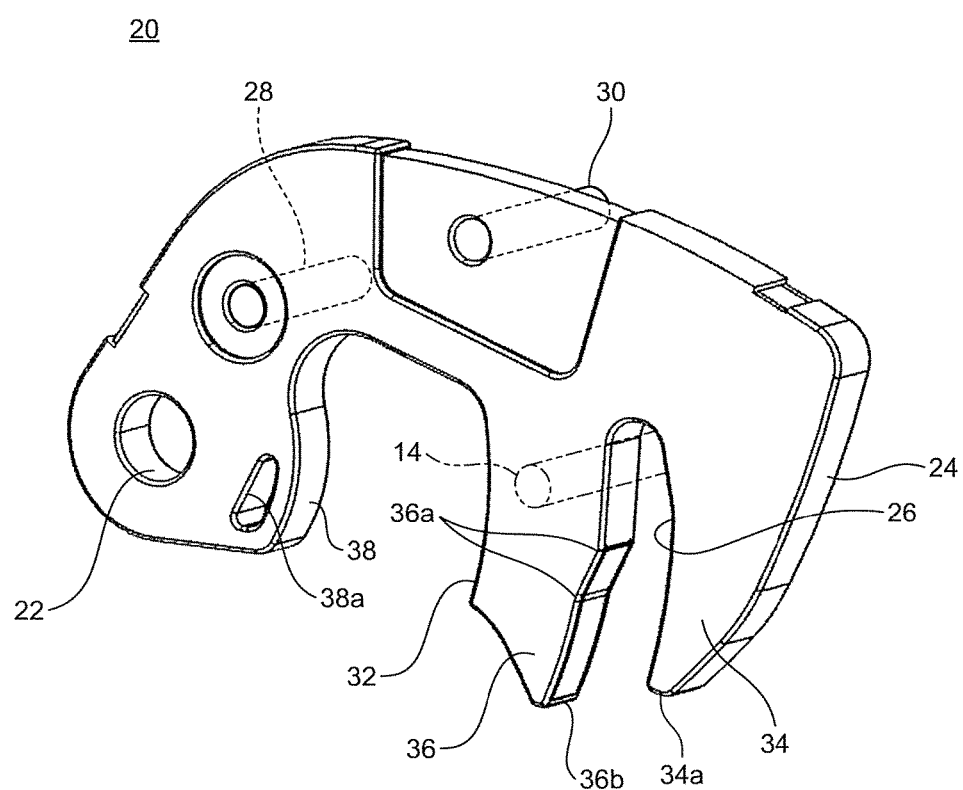
FIG. 2 is a perspective view of a hook member.

The hook member 20 illustrated in FIG. 2 is a part that retains the seat back 12b in a locked state by engaging with the striker 14, and is rotationally biased in the positive direction elastically in the seat lock apparatus 10.

The hook member 20 is a plate like member, and has a shaft hole 22 provided near one end thereof, and an inclined hook edge face 24 that is rotationally biased in the negative direction by the striker 14 coming into contact therewith, the striker 14 entering from the right. Further, the hook member 20 has: an engagement groove 26 having a depth enabling the hook member 20 to be in a locked position by the entering striker 14 fitting into the depth after overriding the inclined hook edge face 24; a restraint pin 28 that protrudes to a far side of the surface of the paper; an interlock pin 30 that protrudes to the far side of the surface of the paper; and a loosely fitting groove 32 provided between the engagement groove 26 and a support shaft.

Further, the hook member 20 has a first angular portion 34 and a second angular portion 36 that protrude downward, at a side opposite to the shaft hole 22. The inclined hook edge face 24 is formed as an outer side surface of the first angular portion 34, the engagement groove 26 is formed as a space interposed between the first angular portion 34 and the second angular portion 36, and the loosely fitting groove 32 is formed between the second angular portion 36 and the shaft hole 22. On a left side surface of the engagement groove 26, that is, on a right side surface of the second angular portion 36, a moderately bent portion 36a is provided. The inclined hook edge face 24 is a curved inclined surface that approaches the shaft hole 22 downward. An opening of the engagement groove 26 is a little wider than the striker 14, the engagement groove 26 is a groove that becomes thinner inward, and the deepest portion of the engagement groove 26 is formed a little more narrowly than the striker 14. A distal end 34a of the first angular portion 34 and a distal end 36b of the second angular portion 36 are both end portions of the opening of the engagement groove 26.

The second angular portion 36 is formed a little downward relative to and longer than the first angular portion 34, and the striker 14 entering from the right comes into contact with a lower portion of the second angular portion 36 and is guided into the engagement groove 26, after overriding the inclined hook edge face 24.

The loosely fitting groove 32 is a sufficiently wide region, into which the first striker 14a is fitted, when the second striker 14b engages with the engagement groove 26. A bulged portion 38 is provided in a portion of the loosely fitting groove 32, the portion being a portion that the first striker 14a firstly comes into contact with in the loosely fitting groove 32, the bulged portion 38 being for enabling the portion to have sufficient strength, and a cushioning hole 38a for impact absorption is provided inside the bulged portion 38.

The restraint pin 28 is a portion that is pressed by the cam plate 50 for prevention of rattling of the hook member 20, and is provided near the shaft hole 22. The interlock pin 30 is a portion that performs an interlocking function of preventing further rotation by coming into contact with the cam plate 50 when the hook member 20 receives vibration or impact and rotates in the negative direction, and is provided at a position farther than the restraint pin 28 as seen from the shaft hole 22. The hook member 20 has: a base that is a metal plate for provision of strength; and a resin material that covers around the base.

Figure 3:
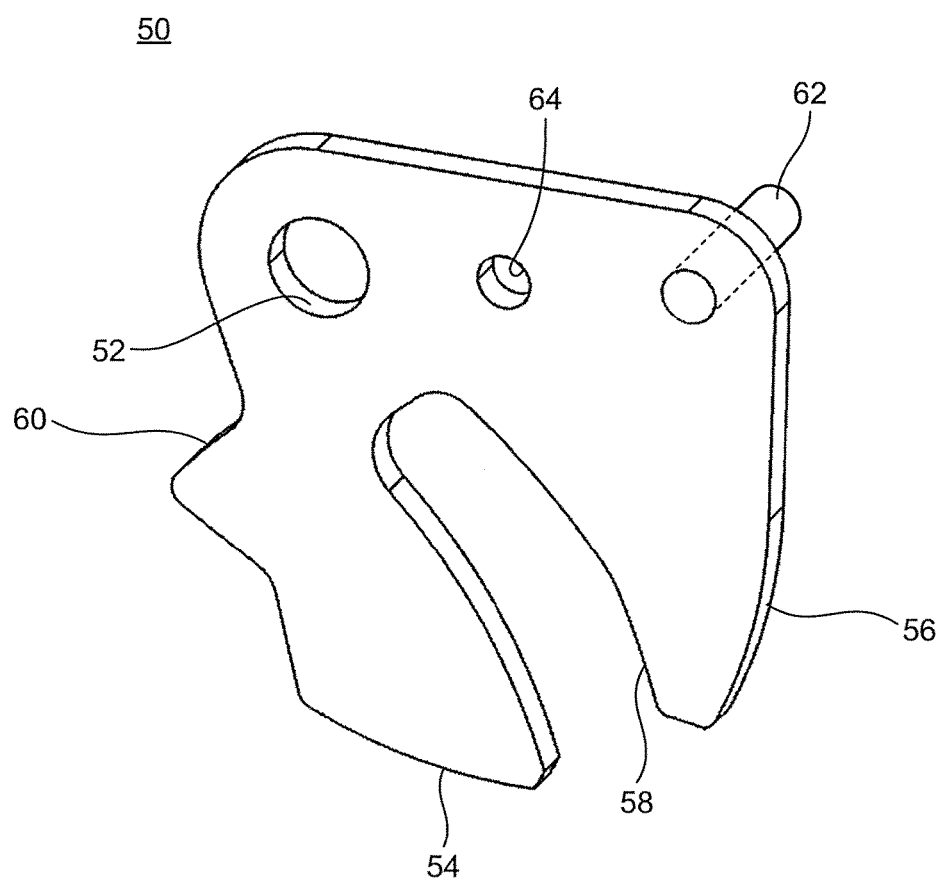
FIG. 3 is a perspective view of a cam plate.

The cam plate 50 illustrated in FIG. 3 is a part for a function of preventing rattling of the hook member 20, and an interlocking function of limiting rotation of the hook member 20 when the hook member 20 rotates in the negative direction by the vibration or impact; and the cam plate 50 is rotationally biased in the positive direction elastically in the seat lock apparatus 10.

The cam plate 50 is a plate like member that is approximately crab claw shaped and is made of metal, and has a shaft hole 52 provided near one end thereof, a cam surface 54, and an interlock surface 56. The cam plate 50 is switched over: to a restricting position of restricting rotation of the hook member 20 in the negative direction when the hook member 20 is in the locked position by engaging with the striker 14; and to a pin retraction position (allowing position) when the striker 14 enters and when an engagement releasing operation for the striker 14 has been performed.

The cam surface 54 is formed as a part of a lower side, and is mostly curved moderately. When the hook member 20 is in the locked position where the hook member 20 is in engagement with the striker 14, the cam surface 54 rotationally biases the hook member 20 in the positive direction by elastically pressing the restraint pin 28, and prevents rattling of the hook member 20.

The interlock surface 56 is formed as a part of a right side, and is a curved inclined surface that goes to the left downward. When the hook member 20 receives vibration or impact and the restraint pin 28 rotates the cam surface 54 in the negative direction while pressing the cam surface 54, the interlock pin 30 comes into contact with the interlock surface 56 and restricts rotation thereof before the striker 14 comes out from the engagement groove 26.

Further, the cam plate 50 has: an escape groove 58 provided between the cam surface 54 and the interlock surface 56; a stopper surface 60 that comes into contact with the sensing lever 70 when the seat lock apparatus 10 is in disengagement with the striker 14; a cam release pin 62 that is operated by the open lever 100 in a releasing operation; and a spring engagement hole 64. The shaft hole 52 is provided near one end of an upper end, the cam release pin 62 protrudes to the far side of the surface of the paper near the other end, and the spring engagement hole 64 is provided midway between the shaft hole 52 and the cam release pin 62.

The escape groove 58 is a groove for avoiding interference with the interlock pin 30 when a normal operation is made by an operator and the hook member 20 rotates in the negative direction, is a little wider than the interlock pin 30, and is curved along an operation locus of the interlock pin 30.

The stopper surface 60 is an upper side formed by a part of a left side being bulged triangularly. By the stopper surface 60 being pressed and supported by the sensing lever 70 when the seat lock apparatus 10 is in disengagement with the striker 14, the cam plate 50 is retained in the pin retraction position.

Figure 4:
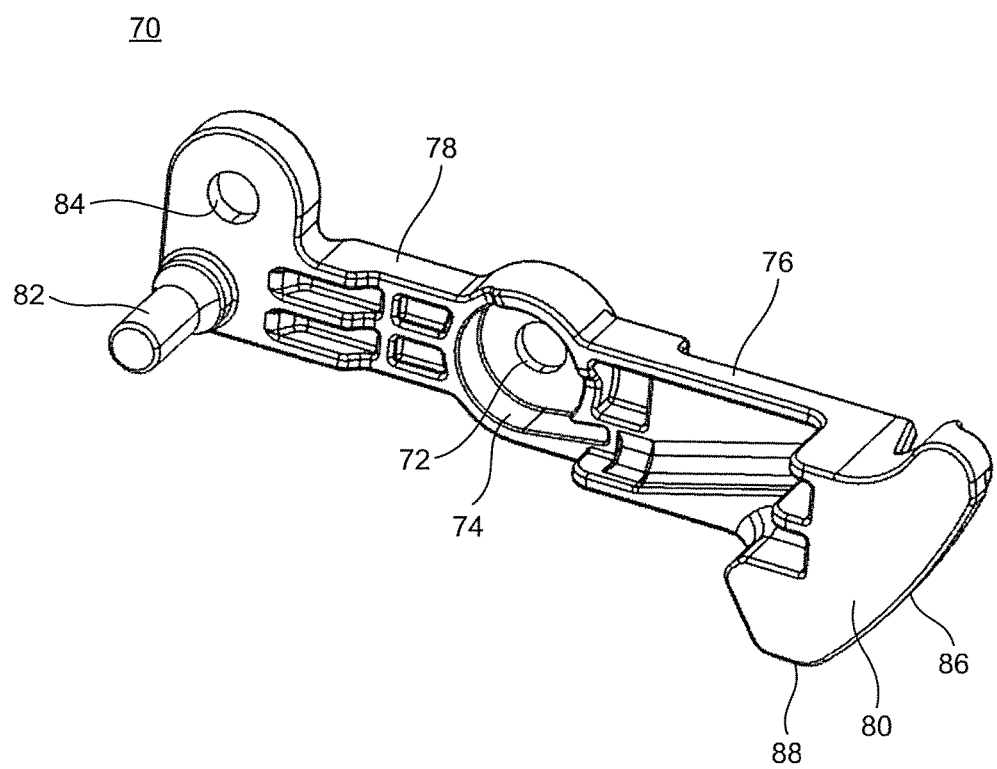
FIG. 4 is a perspective view of a sensing lever.

The sensing lever 70 illustrated in FIG. 4 is a lever member that is formed of a resin material and long in a left-right direction, and is rotationally biased in the positive direction elastically in the seat lock apparatus 10.

The sensing lever 70 has: a shaft hole 72 provided at an approximate center thereof; a spring chamber 74 that is formed around the shaft hole 72 and approximately cylindrical; a first arm 76 that extends to the right; a second arm 78 that extends to the left; a detection portion 80 provided at a distal end of the first arm 76; a stopper pin 82 protruding to the near side of the surface of the paper at a rear end of the second arm 78; and a rod hole 84 formed a little above the stopper pin 82. The first arm 76 and the second arm 78 are arranged linearly and in opposite directions, are each three-dimensionally reinforced with some ribs, and unnecessary portions thereof have been removed therefrom.

The detection portion 80 is provided at a position a little displaced to the near side of the surface of the paper relatively to a distal end portion of the first arm 76, and has an angular shape protruding a little diagonally upward relatively to the first arm 76. The detection portion 80 has a sensing inclined edge face 86 on the right side, and a sensing surface 88 formed at a lower end portion of the sensing inclined edge face 86. The sensing surface 88 protrudes a little downward relatively to a lower surface of the first arm 76. The sensing inclined edge face 86 forms a smooth curved surface, and is rotationally biased in the negative direction by the striker 14 belatedly coming into contact with the sensing inclined edge face 86 after the striker 14 enters and comes into contact with the inclined hook edge face 24 of the hook member 20.

The sensing surface 88 retains the sensing lever 70 in a sensing position by coming into contact with the striker 14 when the striker 14 is fitted into the engagement groove 26 of the hook member 20 and the hook member 20 is in the locked position. The retainment of the sensing lever 70 in the sensing position by the sensing surface 88 is transmitted to an external indicator via the rod hole 84 provided on the opposite side. Thereby, it is able to be confirmed that the seat back 12b has been infallibly locked.

In an initial position where the seat lock apparatus 10 is in disengagement with the striker 14, the stopper pin 82 retains the cam plate 50 in the pin retraction position by pressing the stopper surface 60 of the cam plate 50. The sensing lever 70 is in a stationary state in either the initial position or the sensing position.

Figure 5:
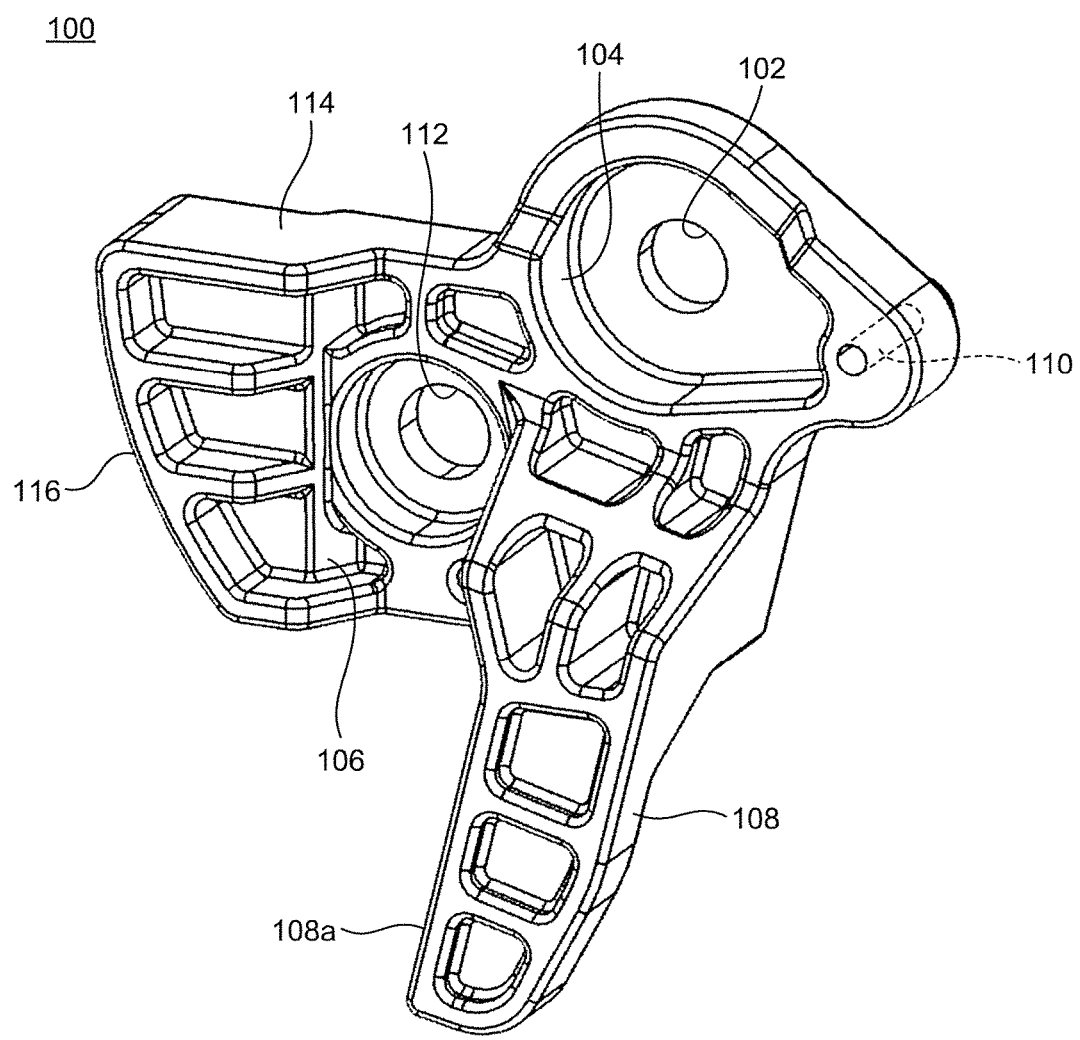
FIG. 5 is a perspective view of an open lever.
Figure 6:
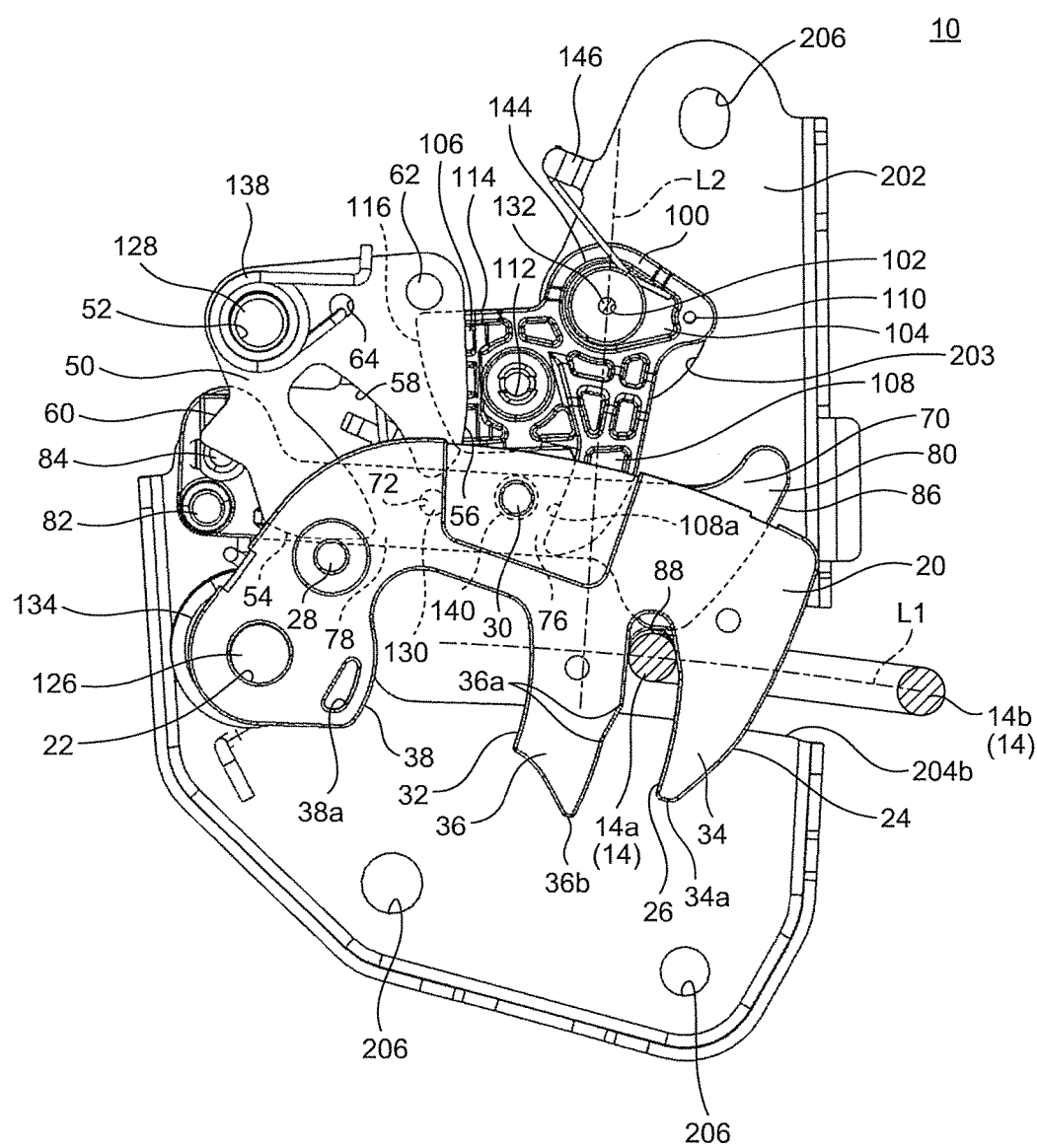
FIG. 6 is a side view of the seat lock apparatus, with illustration of a part thereof being omitted.

The open lever 100 illustrated in FIG. 5 is a part operated from the operation knob 16 (see FIG. 1) for release of the engagement between the hook member 20 and the striker 14, and is rotationally biased elastically in the negative direction in the seat lock apparatus 10.

The open lever 100 has: a shaft hole 102; a spring chamber 104 that is formed around the shaft hole 102 and approximately cylindrical; a cam release action portion 106; a hook release lever 108; and a restriction pin 110.

The cam release action portion 106: is a member that protrudes from a lower portion of the spring chamber 104 and an upper portion of the hook release lever 108, in a left direction, and that is a little broad; and has a rod hole 112, a cam release lever surface 114, and a cam holding curved surface 116. The rod hole 112 is a hole provided at a position diagonally downward to the left from the shaft hole 102, and is connected to the operation knob 16. By the rod hole 112 being pulled upward through the operation knob 16, the open lever 100 is rotated in the positive direction.

The cam release lever surface 114 is a plane that is formed as an upper side of the cam release action portion 106 and that is linear in a side view thereof. The cam holding curved surface 116 is a curved surface that is formed continuously from a left end portion of the cam release lever surface 114 and that centers around the shaft hole 102.

When the open lever 100 is rotated in the positive direction under action of the operation knob 16, the cam release lever surface 114 rotates the cam plate 50 up to the pin retraction position in the negative direction by pressing the cam release pin 62 of the cam plate 50 while slidingly contacting the cam release pin 62. Further, when the open lever 100 is rotated further in the positive direction, the cam holding curved surface 116 retains the cam plate 50 in the pin retraction position while slidingly contacting the cam release pin 62.

The hook release lever 108 extends from a lower portion of the spring chamber 104, diagonally downward to the near side of the surface of the paper. When the open lever 100 is rotated in the positive direction under action of the operation knob 16, a hook release lever surface 108a, which is a left side surface of the hook release lever 108, presses the interlock pin (hook release pin) 30 of the hook member 20 while slidingly contacting the interlock pin 30 so as to rotate the hook member 20 in the negative direction until the striker 14 comes out from the engagement groove 26. As described above, the interlock pin 30 is a part having an interlocking function serving as a retainer of the striker 14, but also has a function as a hook release pin that releases the striker 14. A hook release pin may be provided as a dedicated pin separate from the interlock pin 30. The hook release lever 108 and the cam release action portion 106 are three-dimensionally reinforced with some ribs, and unnecessary portions thereof have been removed therefrom. The restriction pin 110 is a pin that protrudes to the far side of the surface of the paper a little rightward from the shaft hole 102 and that restricts a rotational range of the open lever 100.

Figure 7:
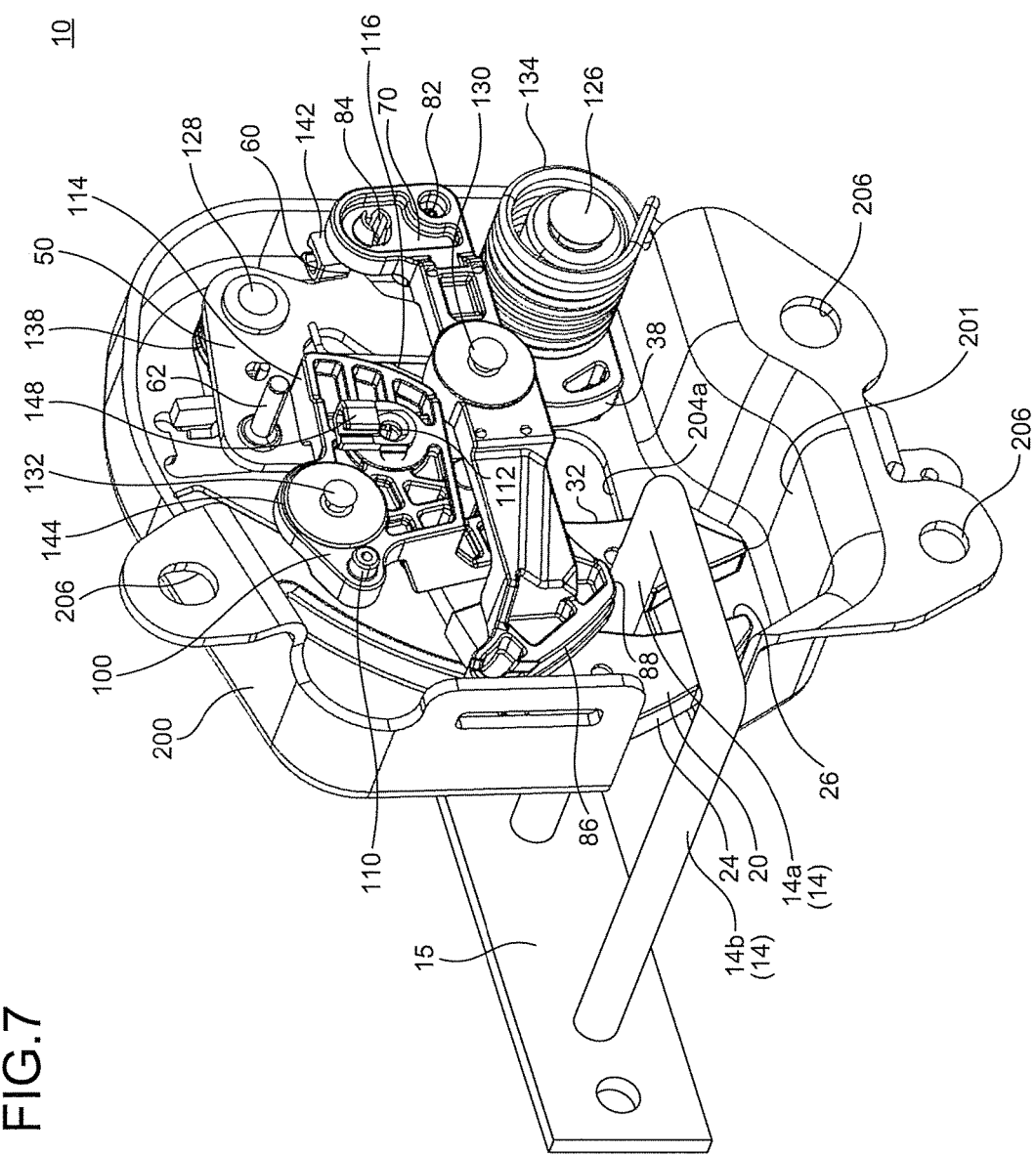
FIG. 7 is a perspective view of the seat lock apparatus, with illustration of a part thereof being omitted.

Next, a configuration of the seat lock apparatus 10 including the above described hook member 20, cam plate 50, sensing lever 70, and open lever 100 will be described in detail, while reference is made to FIG. 6 and FIG. 7. FIG. 6 and FIG. 7 illustrate a state where the seat lock apparatus 10 has been engaged with the first striker 14a. FIG. 6 is a side view of the seat lock apparatus 10 as viewed from one side (a diagram viewed along a shaft direction of the hook member), and FIG. 7 is a perspective view as viewed from a direction approximately opposite to that in FIG. 6. Further, when the seat back 12b is in the standard standing posture, the left side is the front of the vehicle and the right side is the rear of the vehicle, in FIG. 6.

In FIG. 6, a cover member 200 that is at the near side has been removed, and in FIG. 7, a base member 202 that is at the near side has been removed, such that inner parts are exposed. The cover member 200 and the base member 202: respectively have striker entrance grooves 204a and 204b, which the striker 14 enters; are combined together to be integral with each other; and serve as a cover and a base of the seat lock apparatus 10 to cover substantially all of the inner parts. The striker entrance grooves 204a and 204b are congruent with each other in a side view thereof. The cover member 200 and the base member 202 are members for installation of the seat lock apparatus 10 into the seat back 12b, and include installation holes 206. By the cover member 200 and the base member 202, foreign matter is able to be prevented from entering the seat lock apparatus 10, and installation of the seat lock apparatus 10 in the seat back 12b is facilitated. A side surface of the base member 202 comes into contact with a part of the seat back 12b and is fixed thereto.

As illustrated in FIG. 6 and FIG. 7, the seat lock apparatus 10 has the cover member 200 and base member 202 configured as bases, and has the hook member 20, the cam plate 50, the sensing lever 70, and the open lever 100. With reference to FIG. 6, the hook member 20 is at the nearest side, the cam plate 50 is on the upper left side of the hook member 20 at a far side of the hook member 20, and the open lever 100 and the sensing lever 70 are arranged side by side in an up-down direction at a far side of the cam plate 50. The open lever 100 and the sensing lever 70 partially overlap each other in a plan view thereof.

The shaft holes 22, 52, 72, and 102 of the hook member 20, the cam plate 50, the sensing lever 70, and the open lever 100 are respectively supported pivotally about shafts 126, 128, 130, and 132. The shafts 126, 128, 130, and 132 are fixed to the cover member 200 and/or the base member 202.

The shaft 128 and the shaft 132 are placed side by side substantially horizontally. Further, two lines toward the shaft 126 and the shaft 132 from the shaft 128 being the apex are substantially orthogonal to each other. Two lines toward the shaft 128 and the shaft 126 from the shaft 130 being the apex are substantially orthogonal to each other. Two lines toward the shaft 128 and the shaft 132 from the shaft 130 being the apex are substantially orthogonal to each other.

Further, when the first striker 14a are in engagement with the engagement groove 26, two lines toward the shaft 128 and the first striker 14a from the shaft 126 being the apex are substantially orthogonal to each other. At that time, an angle between two lines toward the first striker 14a and the restraint pin 28 from the shaft 126 being the apex is substantially 45°, and an angle between two lines toward the first striker 14a and the interlock pin 30 therefrom is substantially 30°. At that time, with the shaft 126 being a reference, ratios among distances to the first striker 14a, the interlock pin 30, the restraint pin 28, the shaft 128, the shaft 130, and the shaft 132 are roughly "7:5:2:6:4:8". At that time, the shaft 126, the restraint pin 28, the shaft 130, and the shaft 132 are placed side by side substantially linearly.

The hook member 20 is pivotally supported about the shaft 126, and is rotationally biased elastically in the positive direction by a slightly large torsion spring 134. As illustrated in FIG. 6, a position of the hook member 20 when the striker 14 is in engagement with the engagement groove 26 will be referred to as the locked position. In the locked position, the first angular portion 34 has been displaced substantially maximally to the right side. Since the hook member 20 is rotationally biased in the positive direction, when the seat lock apparatus 10 is in disengagement with the striker 14, the distal end 36b of the second angular portion 36 has been rotationally displaced until the distal end 36b comes into contact with a bottom surface 201 of the cover member 200 (see FIG. 7 and FIG. 11A).

There are three cases, in which the hook member 20 rotates in the negative direction relatively to the locked position. The first case is when the striker 14 enters from the right, comes into contact with the inclined hook edge face 24, and pushes up the first angular portion 34, as the seat back 12b is stood up from the sidelong lying posture to the standard standing posture. The second case is when the hook release lever 108 pushes up the interlock pin 30 under action of the open lever 100. The third case is when a large vibration or impact is received. The first case and the second case are normal operations according to intentions of an operator.

The cam plate 50 is pivotally supported about the shaft 128, and is rotationally biased elastically in the positive direction by a torsion spring 138. One end of the torsion spring 138 is in engagement with the spring engagement hole 64. When the hook member 20 engages with the striker 14 and is in the locked position, the cam plate 50 is in the restricting position of limiting rotation of the hook member 20 in the negative direction and the cam surface 54 comes into contact with and presses the restraint pin 28, thereby preventing rattling of the hook member 20. By the prevention of the rattling of the hook member 20, abnormal noise is not generated and durability of the parts is able to be improved. Further, due to the action of the cam surface 54, the hook member 20 will not be rotated in the negative direction just by vibration or impact of a certain degree.

When the restraint pin 28 rotates in the negative direction while pushing the cam surface 54, by the hook member 20 receiving a large vibration or impact, that is, in the above described third case; as described later, the interlock pin 30 comes into contact with the interlock surface 56 and restricts further rotation before the striker 14 comes out from the engagement groove 26. Further, in the above described first case and second case, the cam plate 50 is brought into the pin retraction position such that the interlock pin 30 goes into the escape groove 58 without interfering with the interlock surface 56. That is, in the first case, the stopper pin 82 of the sensing lever 70 supports the stopper surface 60 (see FIG. 11A), and in the second case, the cam release pin 62 is supported by the cam holding curved surface 116 of the open lever 100 (see FIG. 12C).

Further, as understood from FIG. 6, the cam plate 50 is provided on the open lever 100 side of an entrance locus L1 of the striker 14, and on the hook member 20's shaft 126 side of a perpendicular line L2 to the entrance locus L1 and passing the shaft 132 of the open lever 100. Thereby, a compact shape without any useless space as a whole is able to be formed.

The sensing lever 70 is pivotally supported about the shaft 130, and is rotationally biased elastically in the positive direction by a torsion spring 140. When the hook member 20 is in the locked position and the striker 14 is properly in engagement with the engagement groove 26, the sensing lever 70 is retained in the sensing position where the sensing lever 70 has rotated a little in the negative direction by the sensing surface 88 coming into contact with an upper surface thereof. At that time, by an indicator rod that is connected to the rod hole 84 via an adapter 142 and not illustrated in the drawings, positional information thereof is transmitted to the external indicator. That is, the rod hole 84, the adapter 142, and the indicator rod serve as a means for transmitting information. Thereby, an operator is able to confirm that the seat back 12b has been infallibly locked.

The open lever 100 is pivotally supported about the shaft 132, and is rotationally biased elastically in the negative direction by a torsion spring 144. One end of the torsion spring 144 is in engagement with an inner wall of the spring chamber 104, and the other end thereof is in engagement with a projection 146 of the base member 202. By an operation rod being pulled, the open lever 100 is rotated in the positive direction, the operation rod having been connected to the rod hole 112 via an adapter 148 and not illustrated in the drawings. The operation rod is connected to the operation knob 16 (see FIG. 1). Other than the rods, for example, wires may be connected to the adapters 142 and 148. The restriction pin 110 is fitted in a circular arc hole 203 provided in the base member 202, and by both of end portions of this circular arc hole 203 coming into contact with the restriction pin 110, the rotational range of the open lever 100 is limited. By the restriction pin 110, rotation of the open lever 100 is able to be restricted more easily and appropriately.

As understood from FIG. 6, since the open lever 100 is smaller than the hook member 20 and a large force is not applied to the open lever 100, the open lever 100 may be formed of a resin and is lightweight. Compactness and weightlessness of the open lever 100 are able to be realized since the open lever 100 is a part with a single function for release of engagement, and is not related to the interlocking function and the like. Therefore, the open lever 100 is operated lightly by the operation knob 16, and operability thereof is improved.

Figure 8:
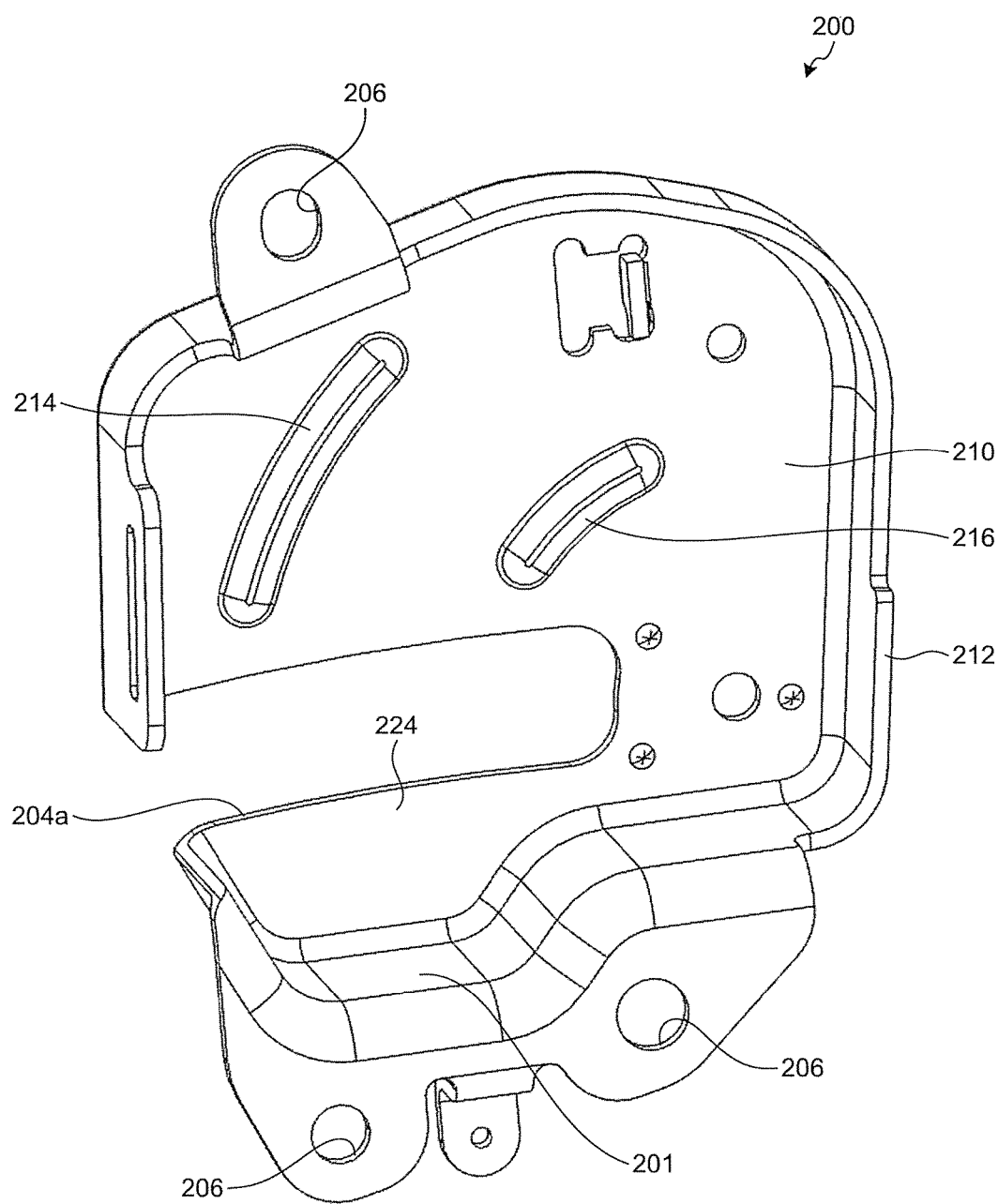
FIG. 8 is a perspective view of a cover member.

As illustrated in FIG. 8, the cover member 200 has a peripheral wall 212 surrounding a periphery of a wide side wall 210, has a shape with one side thereof being open, and has the striker entrance groove 204a formed therein such that parts of the side wall 210 and the peripheral wall 212 are cut off therefrom. Substantially all of the parts of the seat lock apparatus 10 are covered by the side wall 210 and the peripheral wall 212. The bottom surface 201 of the peripheral wall 212 holds the distal end 36b of the second angular portion 36 (see FIG. 7 and FIG. 11A). Ribs including the installation holes 206 are provided at one place in an upper portion and two places in a lower portion, of the peripheral wall 212. Two long and short inward bulged portions 214 and 216 are provided in the side wall 210. The two bulged portions 214 and 216 have circular arc shapes centering around the shaft 126 of the hook member 20, the bulged portion 214 farther from the shaft 126 is a little long, and the bulged portion 216 closer to the shaft 126 is a little short. The bulged portions 214 and 216 reduce a gap from, or lightly contact, the hook member 20 over an operation range of the hook member 20.

In the seat lock apparatus 10, upon normal use thereof (when the striker 14 is being locked by the hook member 20, and when the seat lock apparatus 10 is at an operating step where the striker 14 is engaged with or released from the hook member 20), vibration in a plate thickness direction due to a clearance between the shaft hole 22 of the hook member 20 and the shaft 126 may be generated. Shapes of the bulged portions 214 and 216 are set so as to limit this vibration and reduce sliding friction in the operation of the hook member 20. Further, vibration of the hook member 20 in the locked state due to vibration upon traveling of the vehicle is limited and low grade sound is reduced.

Figure 9:
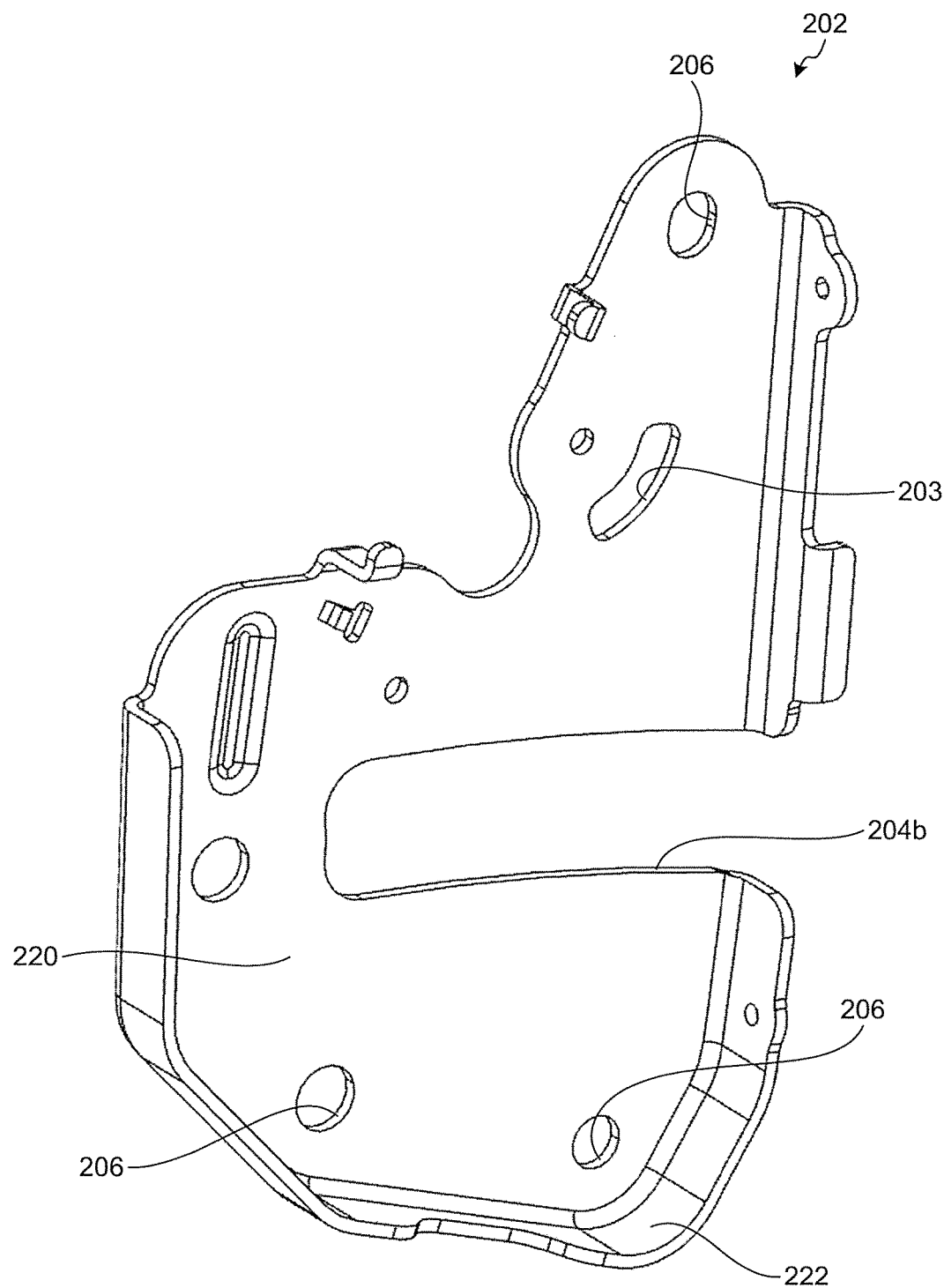
FIG. 9 is a perspective view of a base member.

As illustrated in FIG. 9, the base member 202 has a peripheral wall 222 surrounding a periphery of a wide side wall 220, has a shape with one side thereof being open, and has the striker entrance groove 204b formed therein such that parts of the side wall 220 and the peripheral wall 222 are cut off therefrom. The base member 202 is configured such that the cover member 200 is fitted into the base member 202, and installation holes 206 corresponding to the cover member 200 are provided in the side wall 220.

Figure 10:
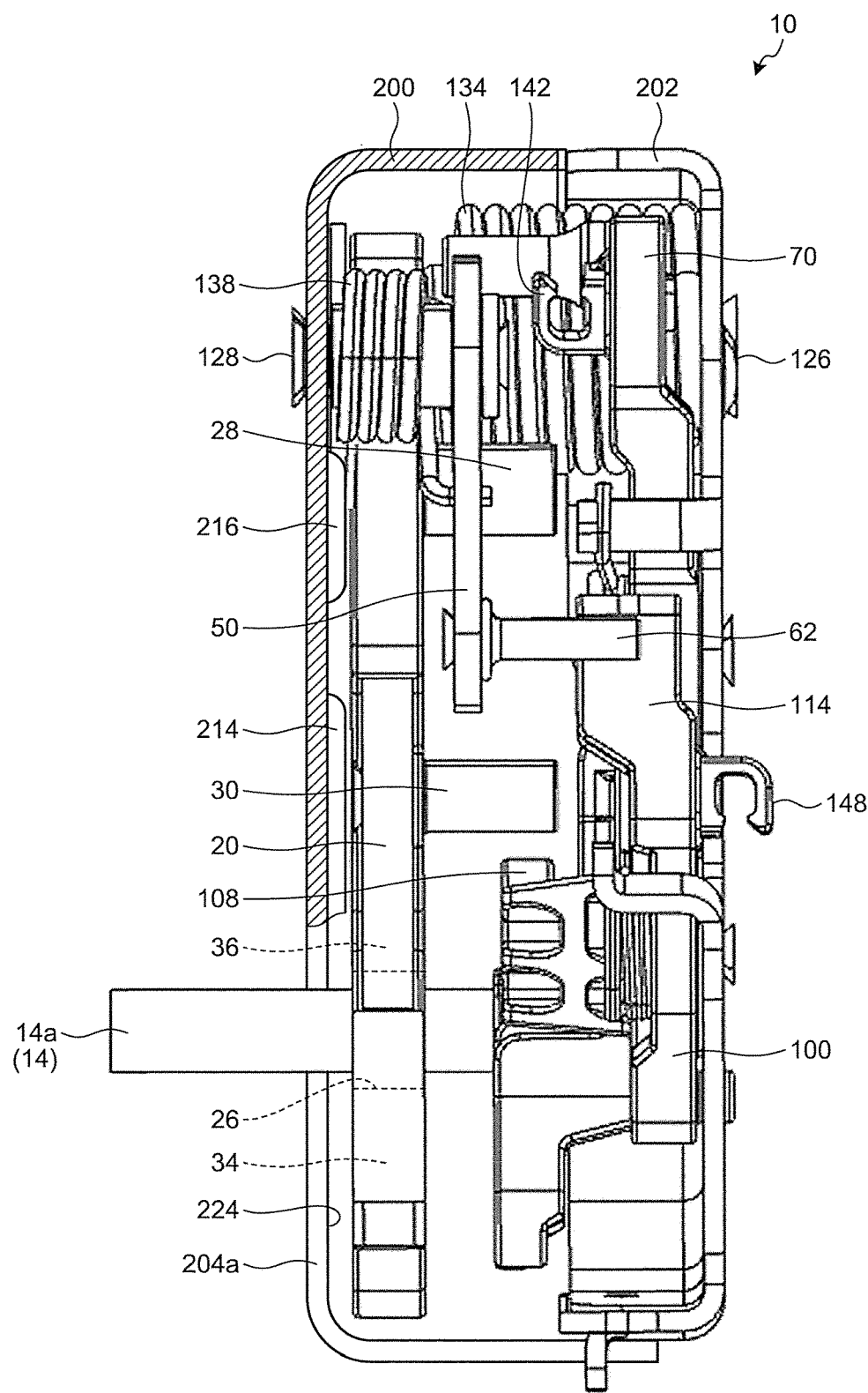
FIG. 10 is a plan view of a partial cross section of the seat lock apparatus.

As illustrated in FIG. 10, the cover member 200 and the base member 202 are combined with each other, and compactly cover the inner parts without any useless gaps. The bulged portions 214 and 216 are close to the hook member 20. One side surfaces of the first angular portion 34 and second angular portion 36 of the distal ends of the hook member 20 face an inner surface of the cover member 200. A gap between each one side surface of the first angular portion 34 and second angular portion 36 and an facing surface 224 below the striker entrance groove 204a is sufficiently narrow and there is no other parts interposed between each one side surface of the first angular portion 34 and second angular portion 36 and the facing surface 224. The cover member 200 and the base member 202 are formed of metal plates and are high in strength. As understood from FIG. 10, while the hook member 20 is formed of a thick plate to be high in strength, the cam plate 50 is comparatively thin.

Next, three main actions of the seat lock apparatus 10 configured as described above will now be described. The three actions correspond to the above described three cases. That is, the three actions correspond to the case where the striker 14 enters and is brought into engagement, the case where the engagement between the engagement groove 26 and the striker 14 is released, and the case where a large vibration or impact is applied to the hook member 20 and the hook member 20 is rotated in the negative direction.

Based on FIG. 11A to FIG. 11D, the action in the first case will be described. That is, the case where the striker 14 enters and is brought into engagement, will be described. In this case, the seat back 12b is stood up from the sidelong lying posture to the standard standing posture by an operator, and when this is viewed from the seat lock apparatus 10, the first striker 14a enters from the right. Further, in this case, operation on the operation knob 16 is unnecessary, and the orientation of the open lever 100 is not changed.

In FIG. 11A to FIG. 11D, for ease of identification of the parts, the hook member 20 and the cam plate 50 are illustrated with bold lines and the sensing lever 70 is illustrated with a thin line; and for prevention of complication of the drawings, illustration of the open lever 100 is omitted. Angle of the seat lock apparatus 10 changes by integrally facing up and down with the seat back 12b, but in the following description, for ease of understanding, it will be supposed that the orientation and position of the seat lock apparatus 10 are fixed and the striker 14 operates relatively thereto.

Figure 11A:
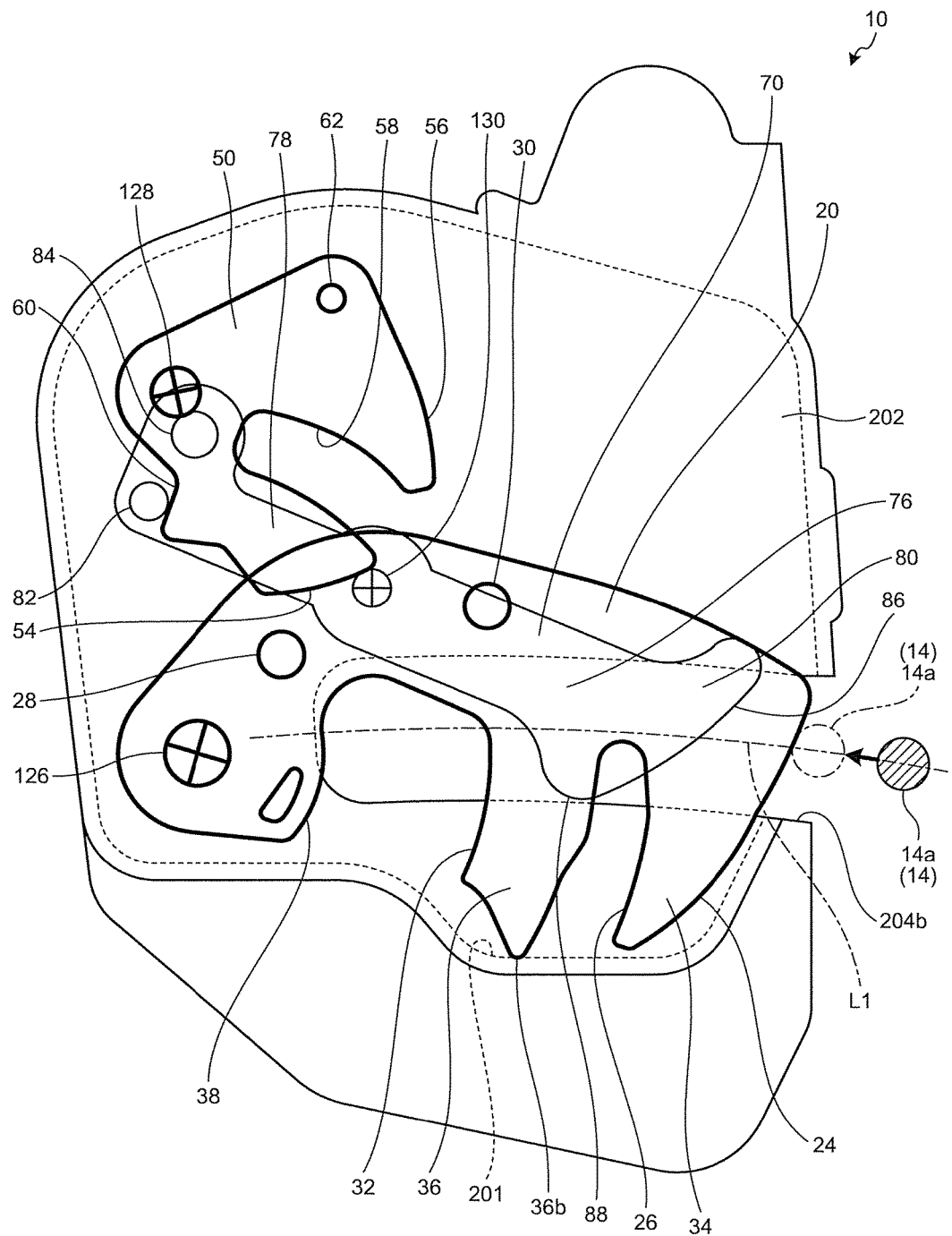
FIG. 11A is a schematic diagram illustrating a first state in a first case where the hook member rotates.

As illustrated in FIG. 11A, in an initial state where the striker 14 is separate from the seat lock apparatus 10, the hook member 20, the cam plate 50, and the sensing lever 70 are at their initial positions.

That is, by being biased in the positive direction, the hook member 20 has been rotationally displaced until the distal end 36b of the second angular portion 36 comes into contact with the bottom surface 201 of the cover member 200. At that time, an upper portion of the inclined hook edge face 24 in the first angular portion 34 is blocking an entrance of the striker entrance groove 204b so as to be diagonal to the entrance locus L1 of the striker 14.

The sensing lever 70 has been displaced maximally in the positive direction by being biased in the positive direction. At this time, the first arm 76 is sloped downward to the right centering around the shaft 130, and a substantially intermediate portion of the sensing inclined edge face 86 is arranged so as to be diagonal to the entrance locus L1 at a side a little deeper than the inclined hook edge face 24 (the left side in FIG. 11A). The second arm 78 slopes upward to the left centering around the shaft 130, and the rod hole 84 has been displaced upward. Thereby, displacement information is transmitted to the indicator via the indicator rod not illustrated in the drawings, and disengagement of the striker 14 is able to be visually confirmed. Further, the stopper pin 82 has been displaced upward maximally, and supports the stopper surface 60 of the cam plate 50.

While being biased in the positive direction, the cam plate 50 is retained in the pin retraction position where the cam plate 50 has been rotated a little in the negative direction relatively to a maximally displaced position in the positive direction by the stopper surface 60 being supported by the stopper pin 82. Thereby, the escape groove 58 is open diagonally downward to the right. Further, at this time, the cam surface 54 is a little separate from the restraint pin 28, and the interlock surface 56 is largely separate from the interlock pin 30.

As illustrated with an imaginary line in FIG. 11A, when the first striker 14a enters from the right side along the entrance locus L1 and approaches the striker entrance groove 204b, firstly, the first striker 14a diagonally comes into contact with the upper portion of the inclined hook edge face 24, and presses the hook member 20 so as to rotate the hook member 20 in the negative direction.

Figure 11B:
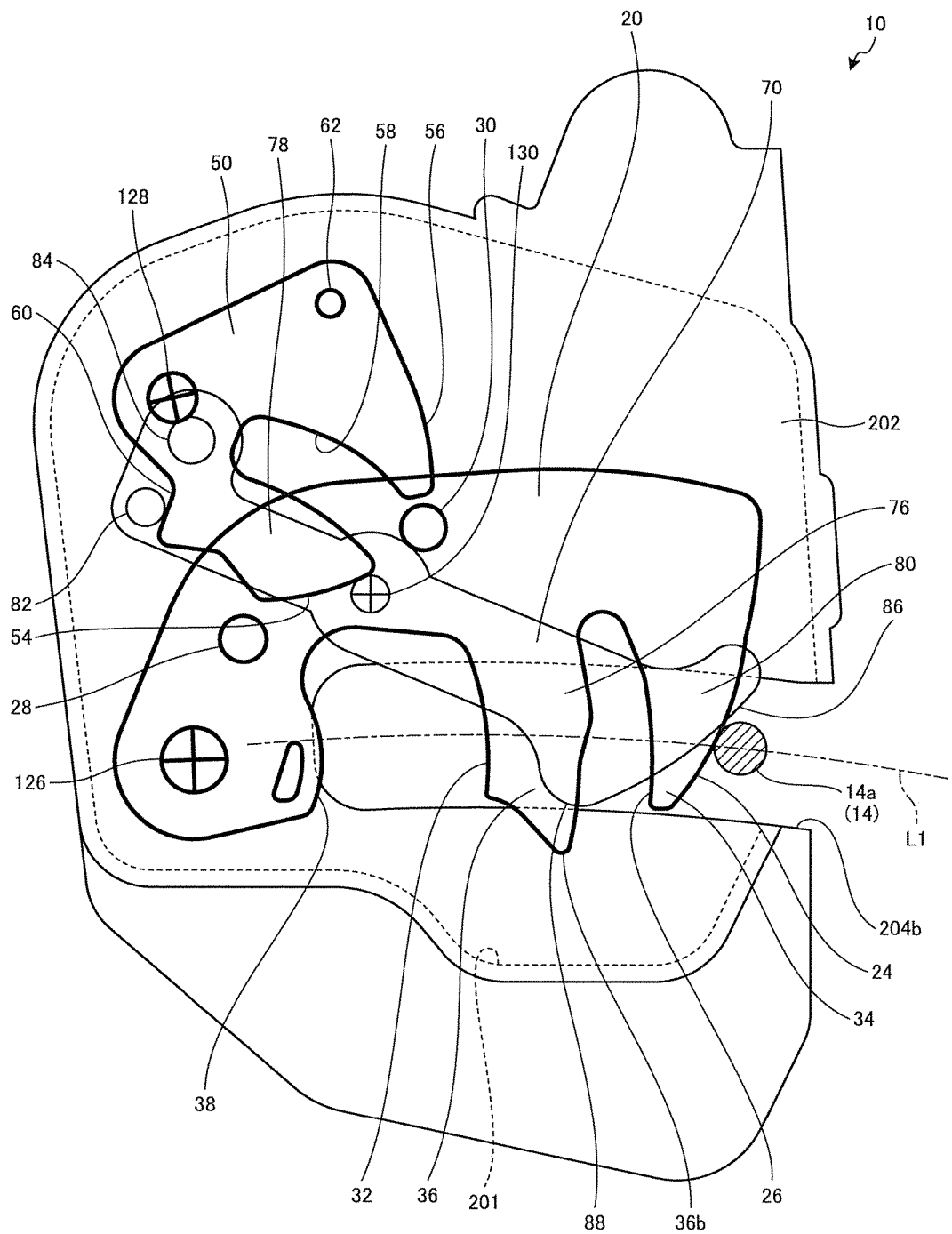
FIG. 11B is a schematic diagram illustrating a second state in the first case where the hook member rotates.

As illustrated in FIG. 11B, when the first striker 14a presses and rotates the hook member 20 in the negative direction while slidingly contacting the inclined hook edge face 24 and advances further, the first striker 14a subsequently comes into contact diagonally with the sensing inclined edge face 86. As that happens, a part of the interlock pin 30 fits into a region near an upper end of the opening of the escape groove 58. Thereby, interference between the interlock pin 30 and the cam plate 50 is avoided. An upper portion of the interlock pin 30 may lightly contact an end portion of the opening of the escape groove 58.

Figure 11C:
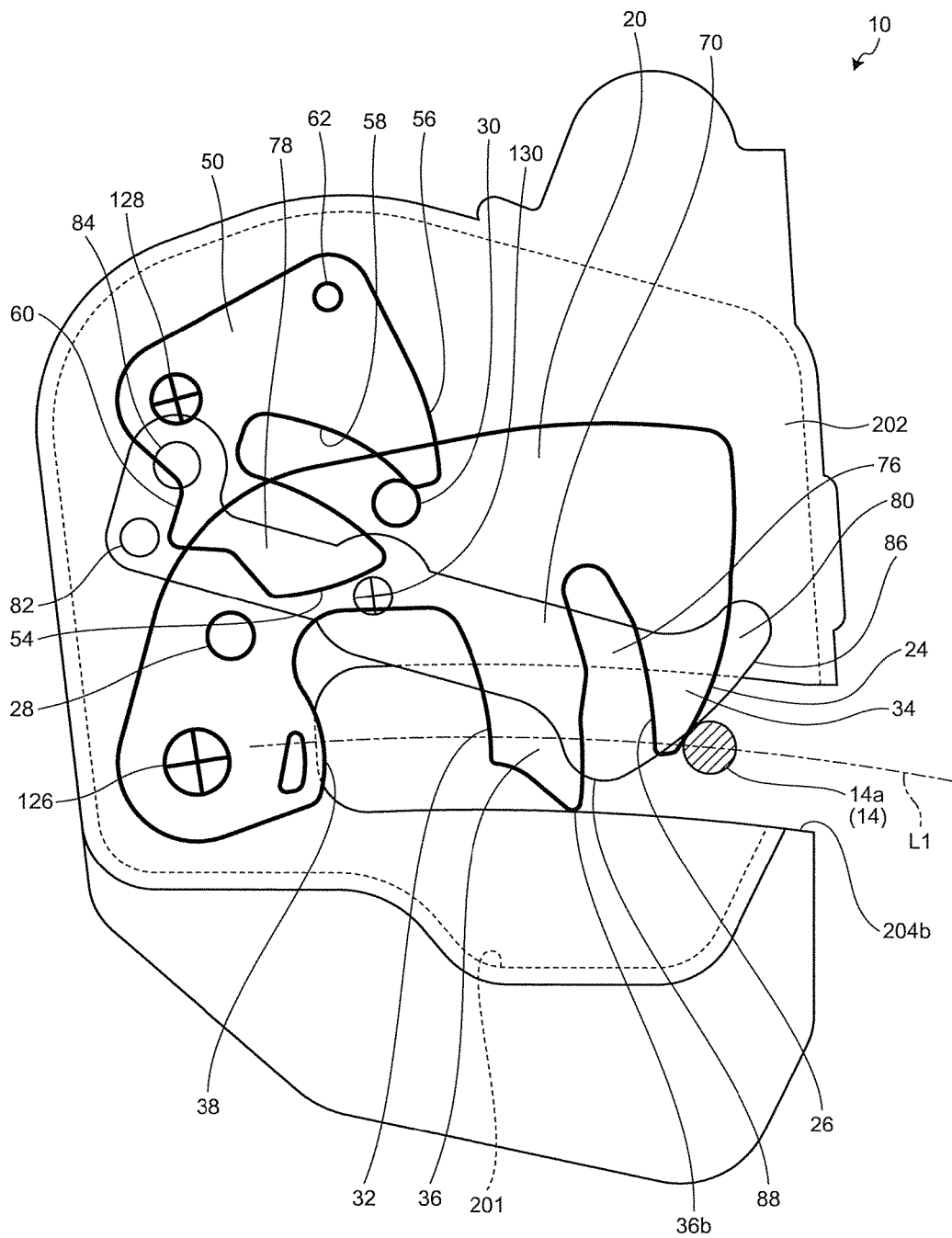
FIG. 11C is a perspective view illustrating a third state in the first case where the hook member rotates.

As illustrated in FIG. 11C, the first striker 14a presses and rotates the hook member 20 and the sensing lever 70 in the negative direction while slidingly contacting the inclined hook edge face 24 and the sensing inclined edge face 86, and advances further. As that happens, the stopper pin 82 is displaced downward and separates from the stopper surface 60, but posture of the cam plate 50 is retained because an upper side surface of the escape groove 58 is in contact with the interlock pin 30. The interlock pin 30 is displaceable in the escape groove 58, and rotation of the hook member 20 in the negative direction is properly continued.

Figure 11D:
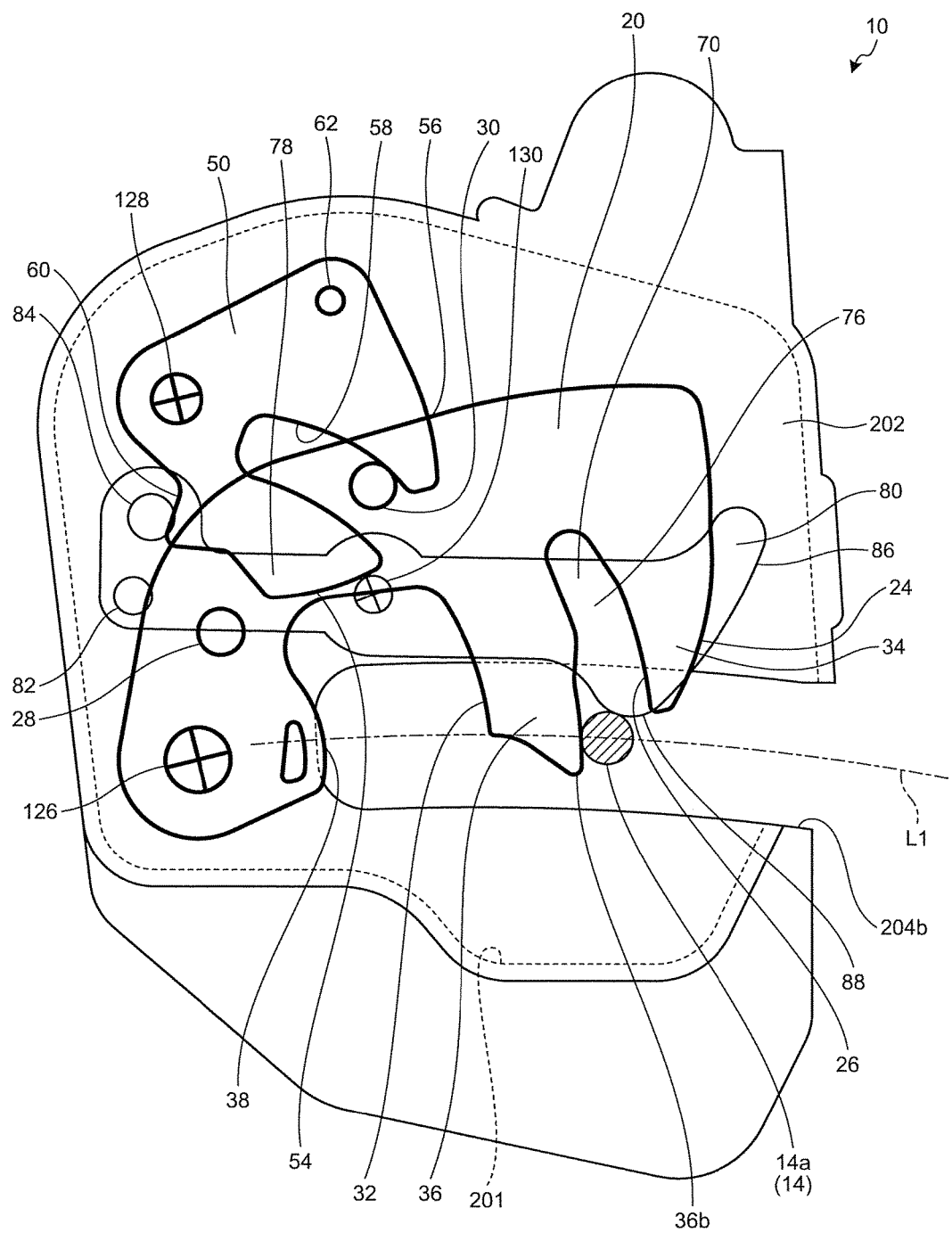
FIG. 11D is a schematic diagram illustrating a fourth state in the first case where the hook member rotates.

As illustrated in FIG. 11D, as the first striker 14a advances further, the first striker 14a overrides the inclined hook edge face 24 and the first angular portion 34, and comes into contact with the lower portion of the second angular portion 36. Since length of the second angular portion 36 is set longer than that of the first angular portion 34, the first striker 14a will not continue to advance into the loosely fitting groove 32. Further, the first striker 14a overrides the sensing inclined edge face 86 and comes into contact with a lower surface of the sensing surface 88, and retains the sensing lever 70 in the sensing position.

Thereafter, as illustrated in FIG. 6, since the hook member 20 is elastically biased, the hook member 20 rotates in the positive direction, and the first striker 14a properly engages with the engagement groove 26. Since the deepest portion of the engagement groove 26 is a little narrower than the first striker 14a, the first striker 14a comes into contact with the engagement groove 26 at two places, and engages with the engagement groove 26 stably. When the hook member 20 rotates in the positive direction, the first striker 14a slidingly contacts a right surface of the second angular portion 36, and since the moderately bent portion 36a is provided on the right surface, a moderate click feeling is obtained and the operator is able to determine that proper operation is being carried out.

By the interlock pin 30 coming out from the escape groove 58, the cam plate 50 also rotates in the positive direction and is brought into the restricting position, the cam surface 54 moderately presses an upper surface of the restraint pin 28, and rattling of the hook member 20 is able to be prevented.

By coming into contact with the lower surface of the sensing surface 88, the first striker 14a retains the sensing lever 70 in the sensing position, and the rod hole 84 is displaced downward. Thereby, displacement information is transmitted to the indicator via the rod not illustrated in the drawings, and infallible engagement of the first striker 14a is able to be visually confirmed.

As described above, in the first case, by the first striker 14a advancing, coming into contact with the inclined hook edge face 24, and rotating the hook member 20 in the negative direction, at least a part of the interlock pin 30 goes into the escape groove once. By the first striker 14a advancing further, coming into contact with the sensing inclined edge face 86, and rotating the sensing lever 70 in the negative direction, the stopper pin 82 is separated from the stopper surface 60, the cam plate 50 is rotated in the positive direction from the pin retraction position, and the cam surface 54 comes into contact with the restraint pin 28.

By such action of the sensing lever 70, when the first striker 14a enters, the interlocking function is invalidated such that the cam plate 50 is retained in the pin retraction position and the interlock pin 30 does not interfere with the interlock surface 56, and the hook member 20 is able to be rotated properly. Further, since the first striker 14a is caused to come into contact with the sensing inclined edge face 86 belatedly after coming into contact with the inclined hook edge face 24; the cam plate 50 is able to be retained in the pin retraction position, operation timing is able to be controlled easily, and the interlock pin 30 is properly inserted in the escape groove 58.

Relative operation and timing among the hook member 20, the cam plate 50, the interlock pin 30, the stopper pin 82, and the stopper surface 60 do not need to be strictly as those described above. For example, according to the above description, the interlock pin 30 is fitted in the region near the upper end of the opening of the escape groove 58, but the interlock pin 30 may be fitted in a region near a lower end of the opening. According to the above description, the cam plate 50 starts to rotate in the positive direction after fitting into the escape groove 58, but the cam plate 50 may start to move to a certain extent in a range of causing no interference before the interlock pin 30 fits into the escape groove 58. The timing to start the operation, the timing to end the operation, the operation speed, and the angle of each part are of course adjustable by the length of the arm portion, the inclination angle of the slid inclined surface, and the pin position, and the interlock pin 30 just needs to be made to go into the escape groove 58 regardless of the interim progress. The same applies to the second case described next.

Next, the action in the second case will be described based on FIG. 12A to FIG. 12E. That is, the case where the engagement is released by an operator operating the operation knob 16 and the hook release lever 108 pushing up the interlock pin 30 under the action of the open lever 100 will be described. In this case, the seat back 12b is shifted from the standard standing posture to the inclined standing posture, or is returned to the sidelong lying posture, by the operator. When viewed from the seat lock apparatus 10, the first striker 14a shifts to the loosely fitting groove 32, and the second striker 14b engages with the engagement groove 26, or the first striker 14a separates away to the right.

In FIG. 12A to FIG. 12E, for ease of identification of the parts, the hook member 20 and the cam plate 50 are illustrated with bold lines and the open lever 100 is illustrated with a thin line; and for prevention of complication of the drawings, illustration of the sensing lever 70 is omitted. By an operator pulling the operation rod connected to the rod hole 112 and not illustrated in the drawings, from the state in FIG. 6, the restriction pin 110 separates from an upper end surface of the circular arc hole 203, and the open lever 100 starts to rotate in the positive direction and shifts into the state illustrated in FIG. 12A.

Figure 12A:
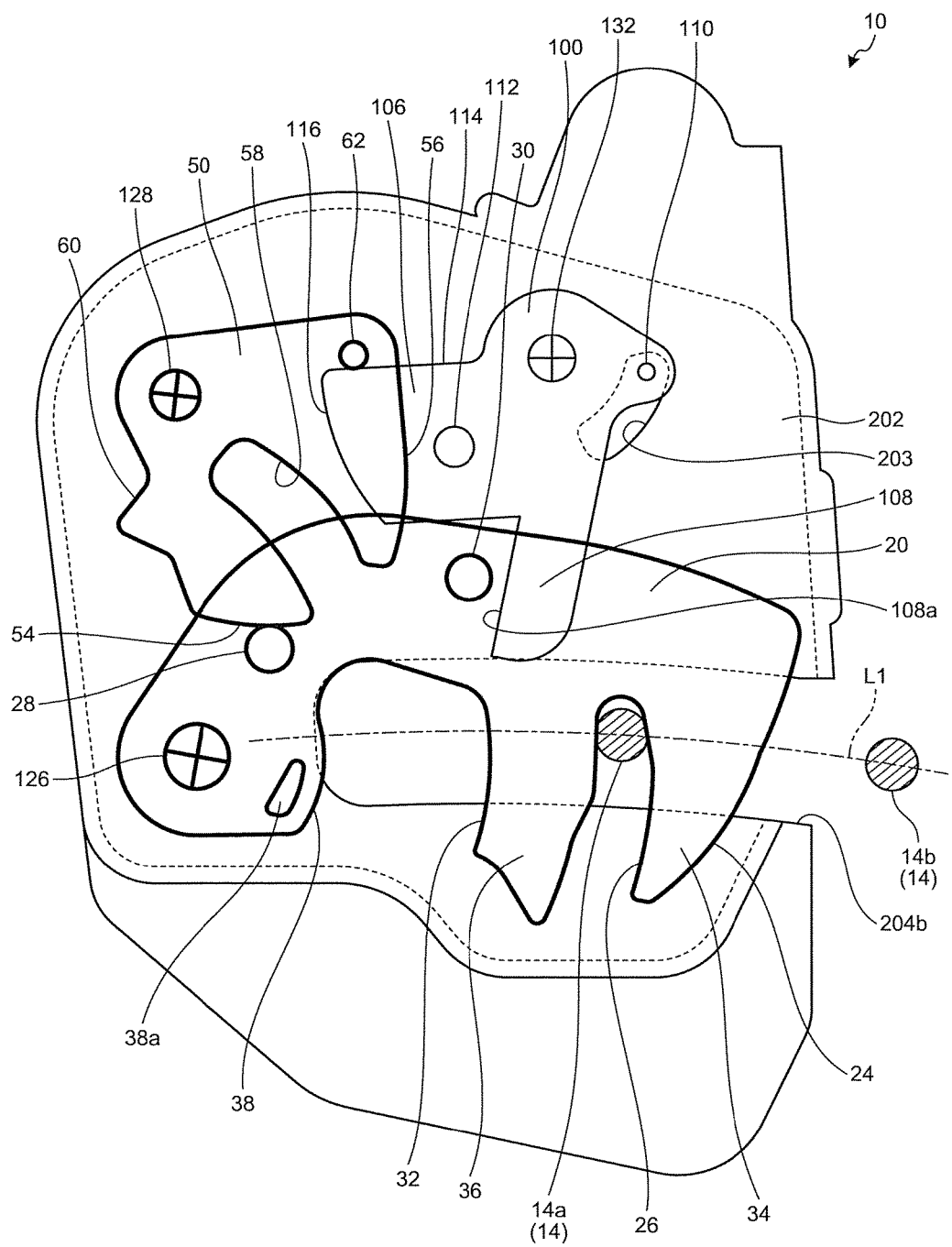
FIG. 12A is a schematic diagram illustrating a first state in a second case where the hook member rotates.

As illustrated in FIG. 12A, when the open lever 100 starts to rotate in the positive direction, firstly, the cam release lever surface 114 comes into contact with a lower surface of the cam release pin 62 of the cam plate 50.

Figure 12B:
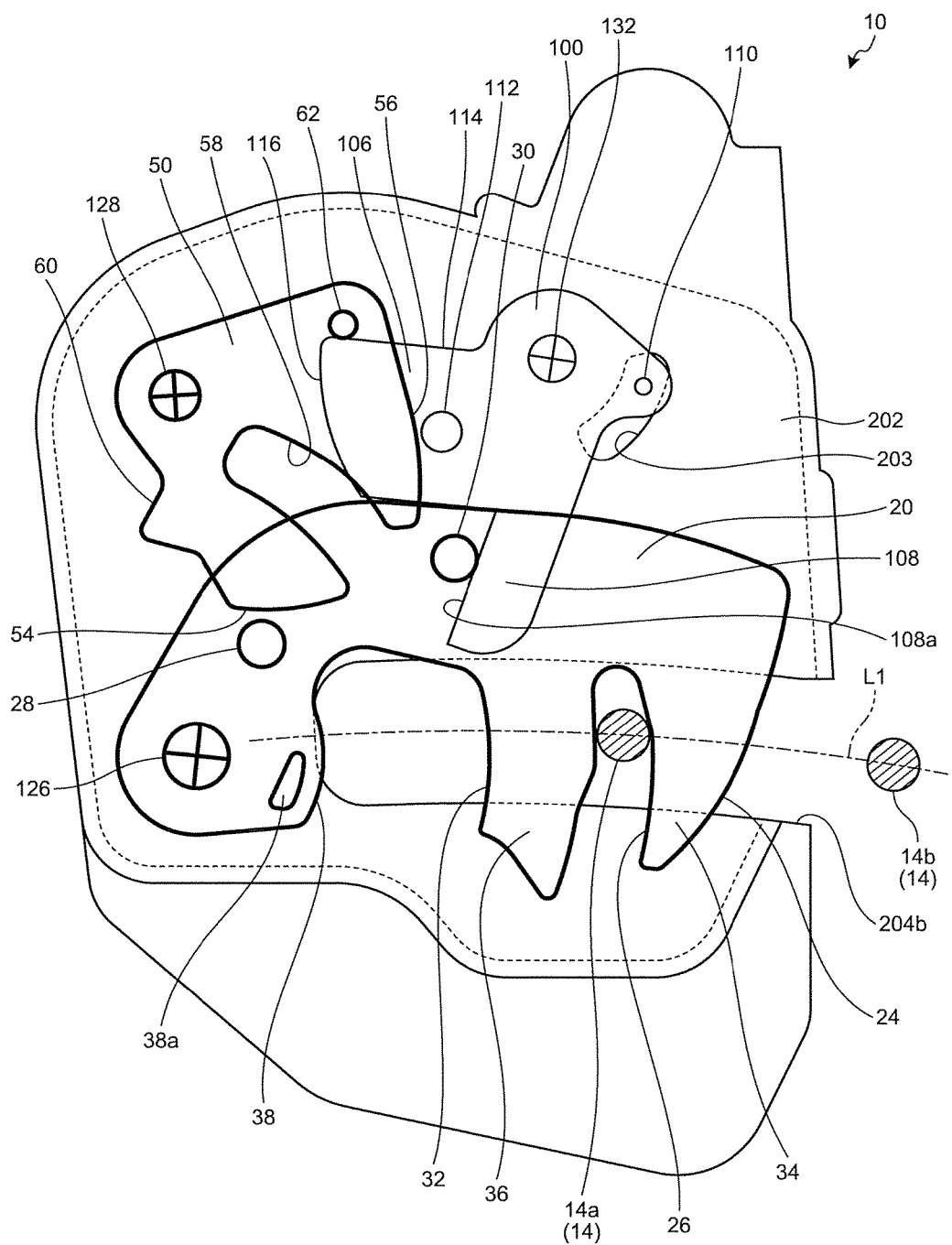
FIG. 12B is a schematic diagram illustrating a second state in the second case where the hook member rotates.

As illustrated in FIG. 12B, when the open lever 100 rotates further, the cam release lever surface 114 presses and rotates the cam plate 50 in the negative direction while slidingly contacting the cam release pin 62. When the cam release pin 62 moves by the sliding contact up to a portion near an end portion of the cam release lever surface 114, the hook release lever surface 108a on the left side of the hook release lever 108 comes into contact with a right surface of the interlock pin 30. At that time, the cam plate 50 has rotated to a certain degree, is at an angle that is substantially the same as that in the pin retraction position illustrated in FIG. 11B, and the escape groove 58 is open downward to the right.

Figure 12C:
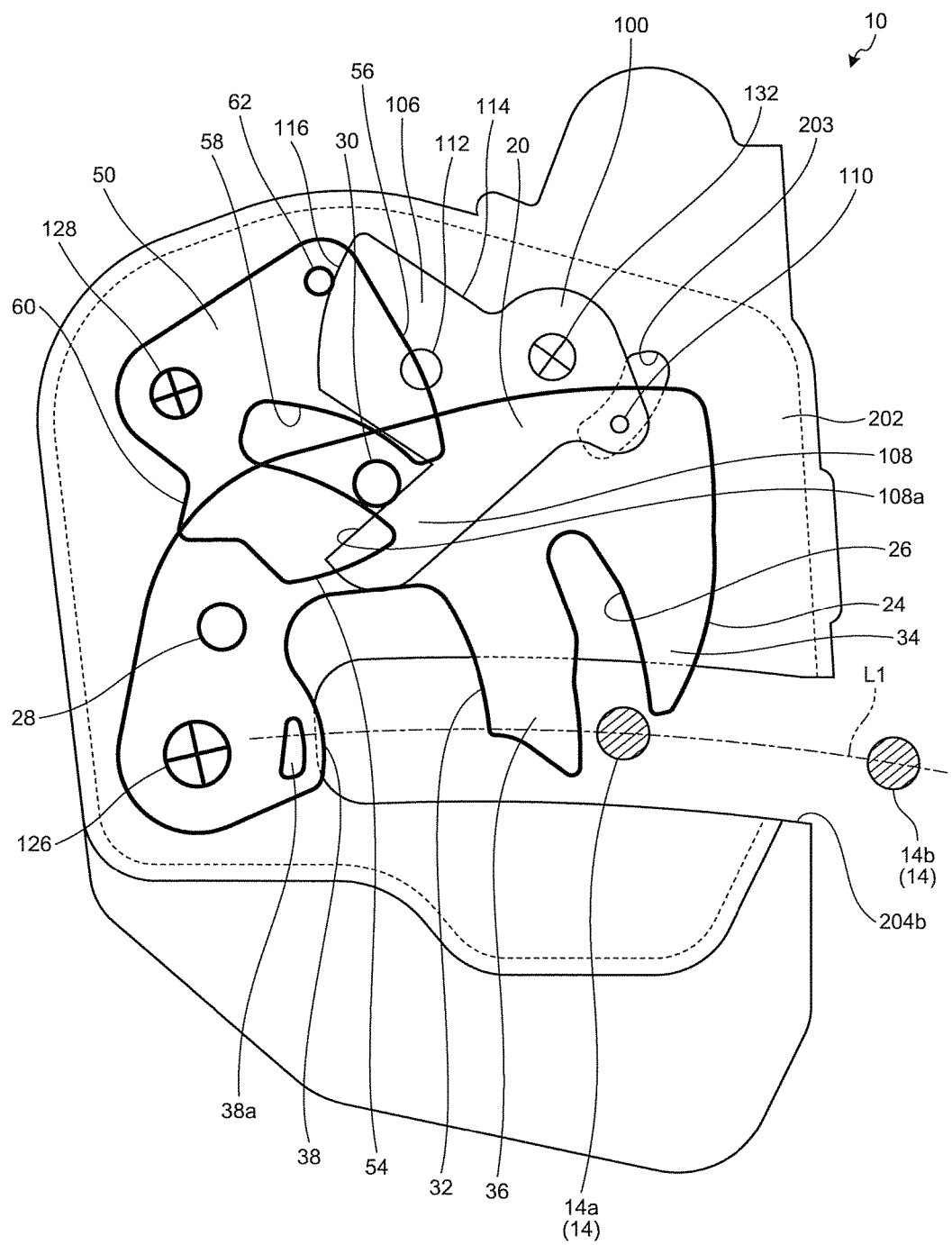
FIG. 12C is a schematic diagram illustrating a third state in the second case where the hook member rotates.

As illustrated in FIG. 12C, when the open lever 100 rotates further, the cam release pin 62 overrides the cam release lever surface 114, slidingly contacts the cam holding curved surface 116, and the cam plate 50 is retained in the pin retraction position. Strictly speaking, the pin retraction position of the cam plate 50 at this time point may be different from the above described first case, but for ease of understanding, in this application, a position where the interlock pin 30 is avoidable with the escape groove 58 is referred to, in a broad sense, as the pin retraction position. The hook member 20 rotates further in the negative direction, the interlock pin 30 is inserted in the escape groove 58 without interfering with the cam plate 50, and the first striker 14a is positioned at the opening of the engagement groove 26. At that time, angles of the hook member 20 and the cam plate 50 are substantially the same as those illustrated in FIG. 11D, and while the first striker 14a is restricted from moving to the left by the second angular portion 36, the first striker 14a is freely movable to the right. Therefore, at this time point, the operator is able to lay down the seat back 12b forward and return the seat back 12b to the sidelong lying posture.

Figure 12D:
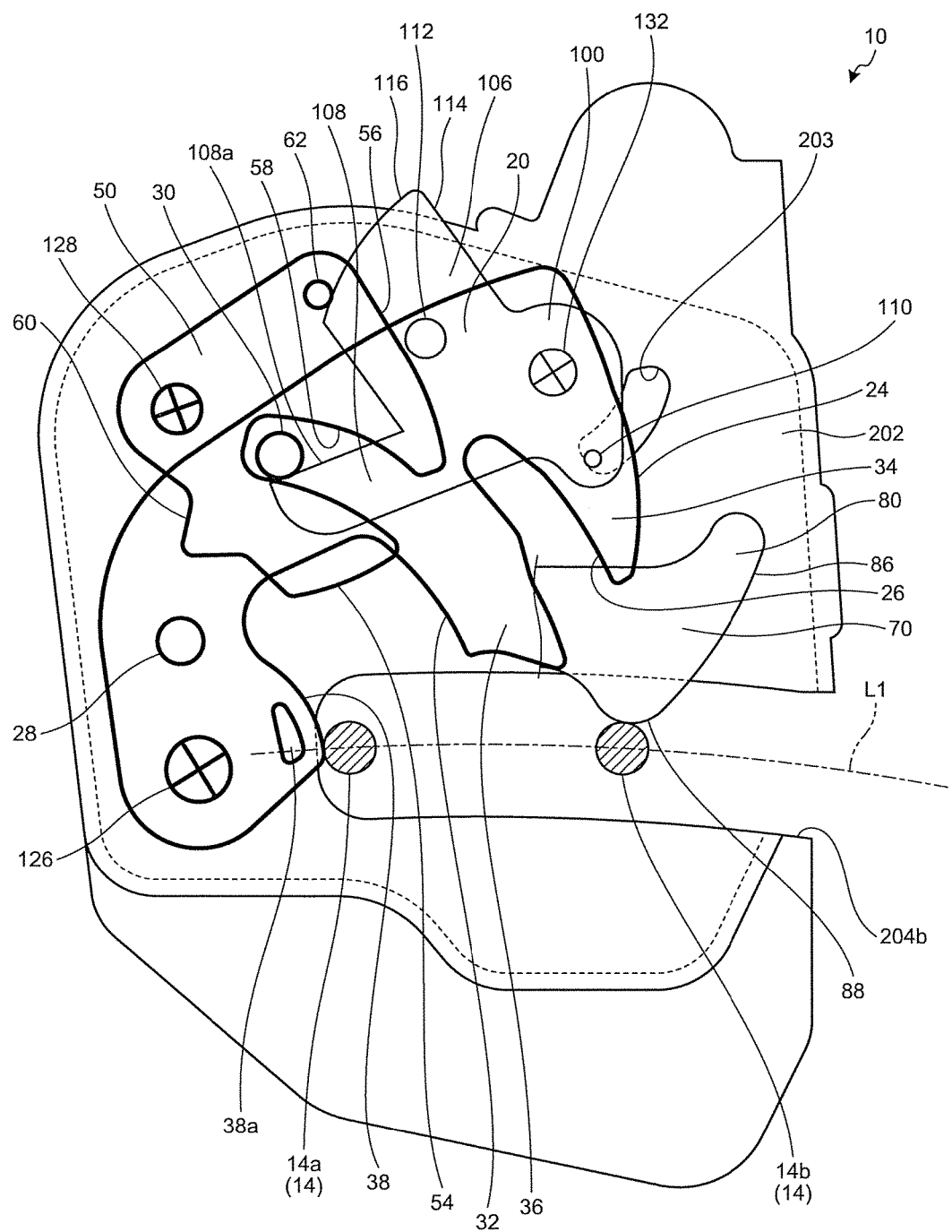
FIG. 12D is a schematic diagram illustrating a fourth state in the second case where the hook member rotates.

As illustrated in FIG. 12D, when the open lever 100 rotates further, at the maximally displaced position, the restriction pin 110 comes into contact with a lower end surface of the circular arc hole 203 and further rotation is restricted. At this time, the first striker 14a has completely separated from the engagement groove 26, and is movable both to the left and the right. When the seat back 12b is moved from the standard standing posture to the inclined standing posture, each of the first striker 14a and the second striker 14b is caused to advance to the left along the entrance locus L1. Thereby, the first striker 14a comes into contact with the bulged portion 38, and the second striker 14b comes into contact with the lower surface of the sensing surface 88. Even if the first striker 14a strikes against the bulged portion 38 rather strongly, the impact is mitigated by the cushioning hole 38a.

The cam plate 50 is retained in the pin retraction position that is the same as the state in FIG. 12C, and even if the interlock pin 30 advances considerably deeply, the interlock pin 30 will not interfere with the cam plate 50.

Figure 12E:
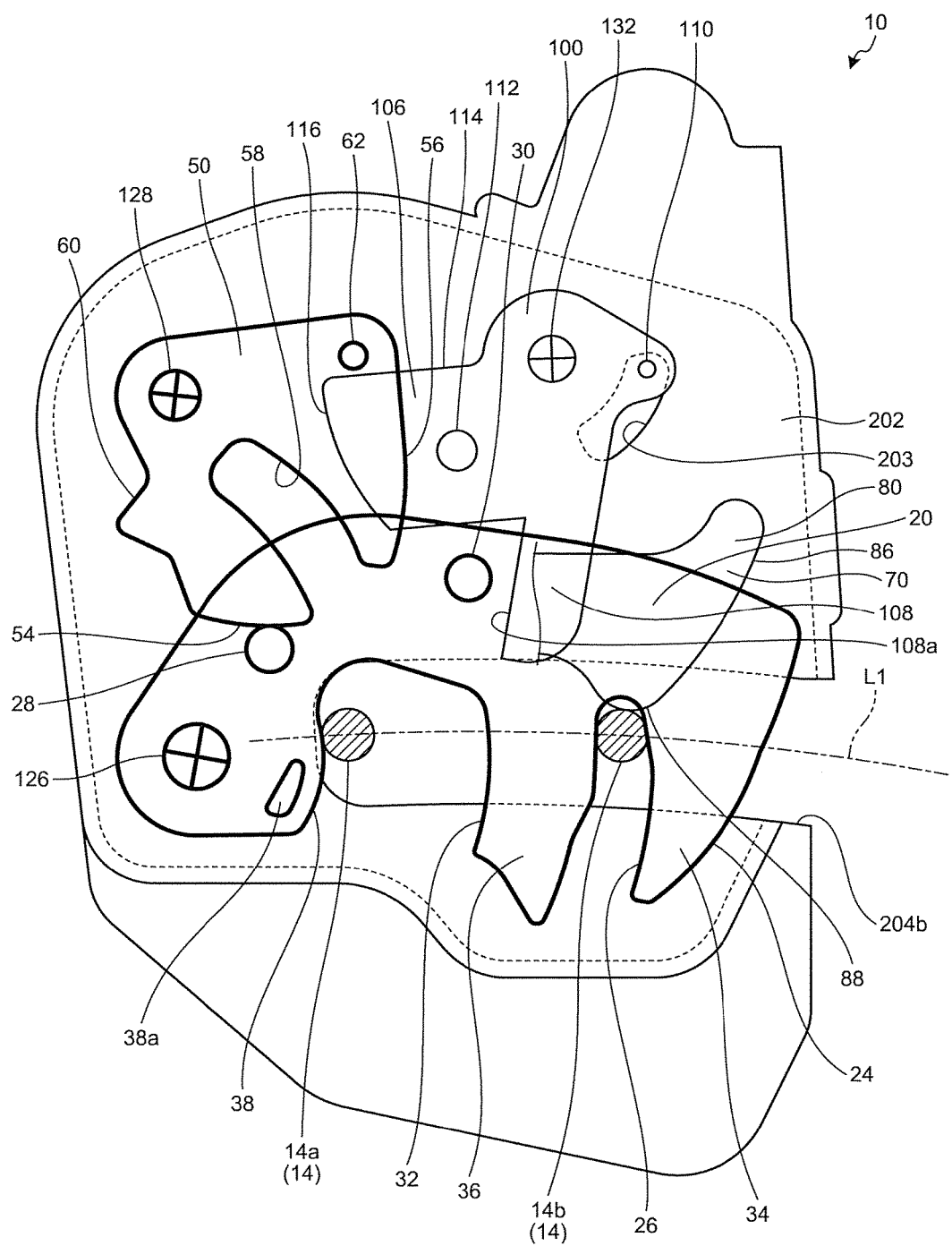
FIG. 12E is a schematic diagram illustrating a fifth state in the second case where the hook member rotates.

Thereafter, when the operator stops the pulling operation on the operation knob 16, the open lever 100 elastically rotates in the negative direction and returns to the original position as illustrated in FIG. 12E. At that time, the hook member 20, the cam plate 50, and the sensing lever 70 have also returned to a state that is the same as that in FIG. 6. That is, between FIG. 12E and FIG. 6, only the positions of the first striker 14a and the second striker 14b are different. In this state also, the cam surface 54 presses the restraint pin 28, and prevents rattling of the hook member 20. The sensing surface 88 of the sensing lever 70 goes down once in association with the movement of the first striker 14a, moves up again by the second striker 14b coming into contact therewith, and proper engagement of the second striker 14b is detected.

As described above, in the second case, when the open lever 100 is rotated in the positive direction, the hook release lever surface 108a comes into contact with the interlock pin 30 belatedly after the cam release lever surface 114 comes into contact with the cam release pin 62. The cam plate 50 rotates prior to the hook member 20, is retained in the pin retraction position, and by rotation of the hook member 20, at least a part of the interlock pin 30 goes into the escape groove 58 once. By such a configuration of the open lever 100, the cam plate 50 is rotated prior to the hook member 20 upon release of the engagement and is retained in the pin retraction position, the interlocking function is invalidated such that the interlock pin 30 does not interfere with the interlock surface 56, and the hook member 20 is able to be rotated properly.

Further, by the cam plate 50 being retained in the pin retraction position prior to the hook member 20, the operation timing is easily controlled, and the interlock pin 30 is inserted in the escape groove 58 properly. Furthermore, even if the rotational range of the open lever 100 is large, the cam plate 50 continues to be retained properly in the pin retraction position by the cam holding curved surface 116.

Figure 13:
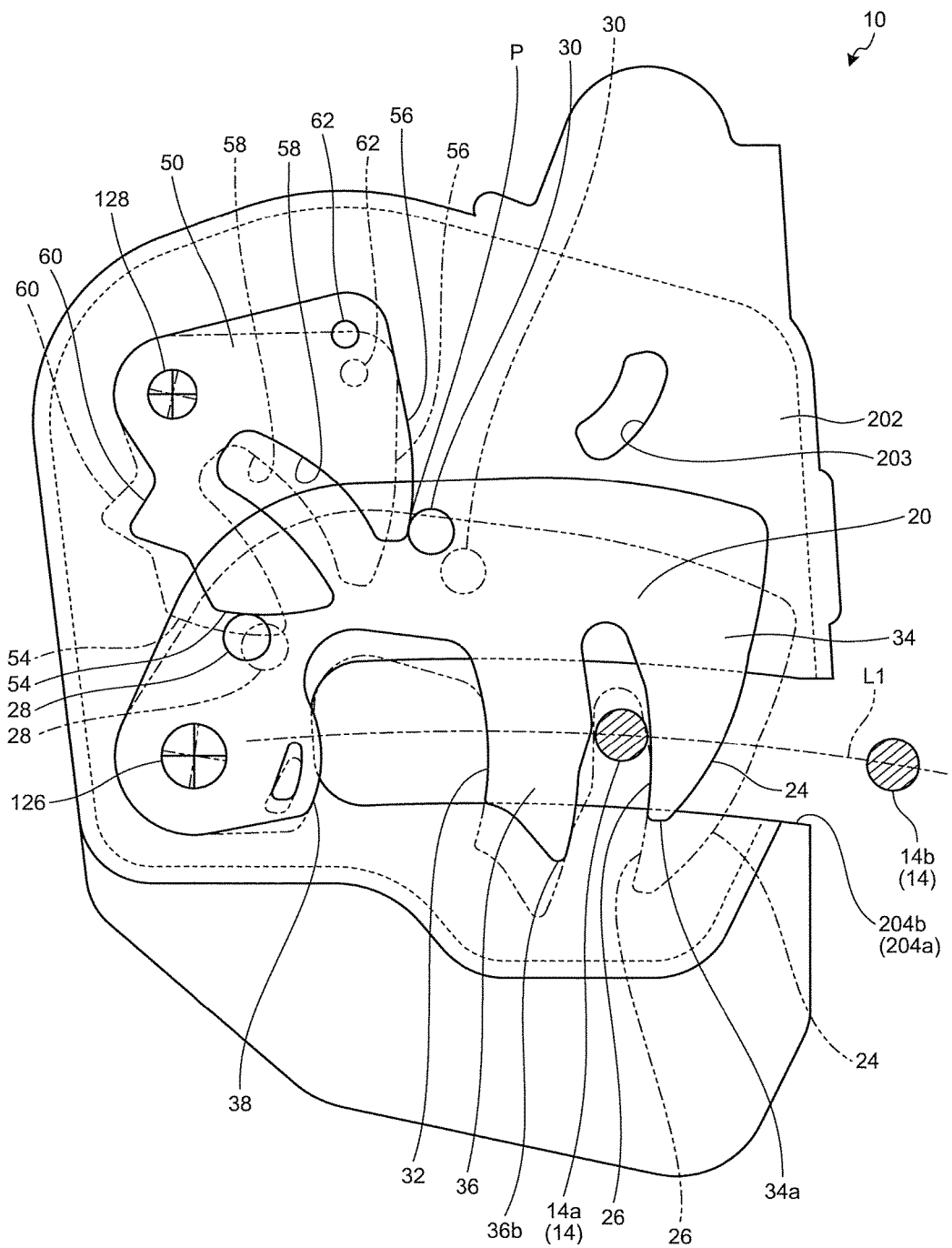
FIG. 13 is a schematic diagram illustrating a third case where the hook member rotates.

Next, the action in the third case will be described based on FIG. 13. That is, the case where the hook member 20 receives a large vibration or impact and is rotated in the negative direction, regardless of the intention of an operator, will be described. In this case, the seat back 12b is in the standard standing posture or the inclined standing posture, and desirably, the engagement between the striker 14 and the engagement groove 26 is not released unexpectedly by the vibration or impact. In FIG. 13, for prevention of complication of the figure, illustration of the sensing lever 70 and the open lever 100 is omitted. The hook member 20 and the cam plate 50 illustrated with imaginary lines in FIG. 13 are in a state that is the same as that illustrated in FIG. 6, which is a state where the striker 14 is in engagement with the engagement groove 26. In this state, even if a small vibration or impact is received, since the restraint pin 28 is pressed by the cam surface 54, the hook member 20 is prevented from rattling, and will not rotate in the negative direction.

As illustrated in FIG. 13, if the hook member 20 receives a large vibration or impact, the restraint pin 28 may rotate a little in the negative direction while pushing the cam surface 54. As that happens, differently from the above described first case and second case, the cam plate 50 is not in the pin retraction position, and the interlock pin 30 will come into contact with the interlock surface 56 without fitting into the escape groove 58. The interlock pin 30 then comes into contact with the interlock surface 56 at a contact point P before the striker 14 comes out from the engagement groove 26, and further rotation thereof is restricted.

That is, in the normal locked position, rotation of the hook member 20 in the negative direction is elastically prevented by the cam surface 54, and is also further blocked infallibly by an interlocking mechanism with the interlock surface 56; and thus the striker 14 will not come out from the engagement groove 26. The open lever 100 is not related to this interlocking mechanism, and thus the open lever 100 is able to be formed small and lightly and operability thereof is improved.

Further, force of the impact applied to the cam plate 50 is set to be directed substantially to the shaft 128 by the direction in which the interlock pin 30 comes into contact therewith and the inclination angle of the interlock surface 56, and thus the cam plate 50 will not rotate further, and the hook member 20 is able to be stopped infallibly. When the vibration or impact is stopped, the hook member 20 is rotated in the positive direction by the elastic force, and returns to the state illustrated with the imaginary line.

Next, action in a case where the load F that is large is applied to the seat lock apparatus 10 in the diagonally rearward direction of the vehicle by the luggage W colliding with the seat back 12b (see FIG. 1) from the rear will be described.

Figure 14:
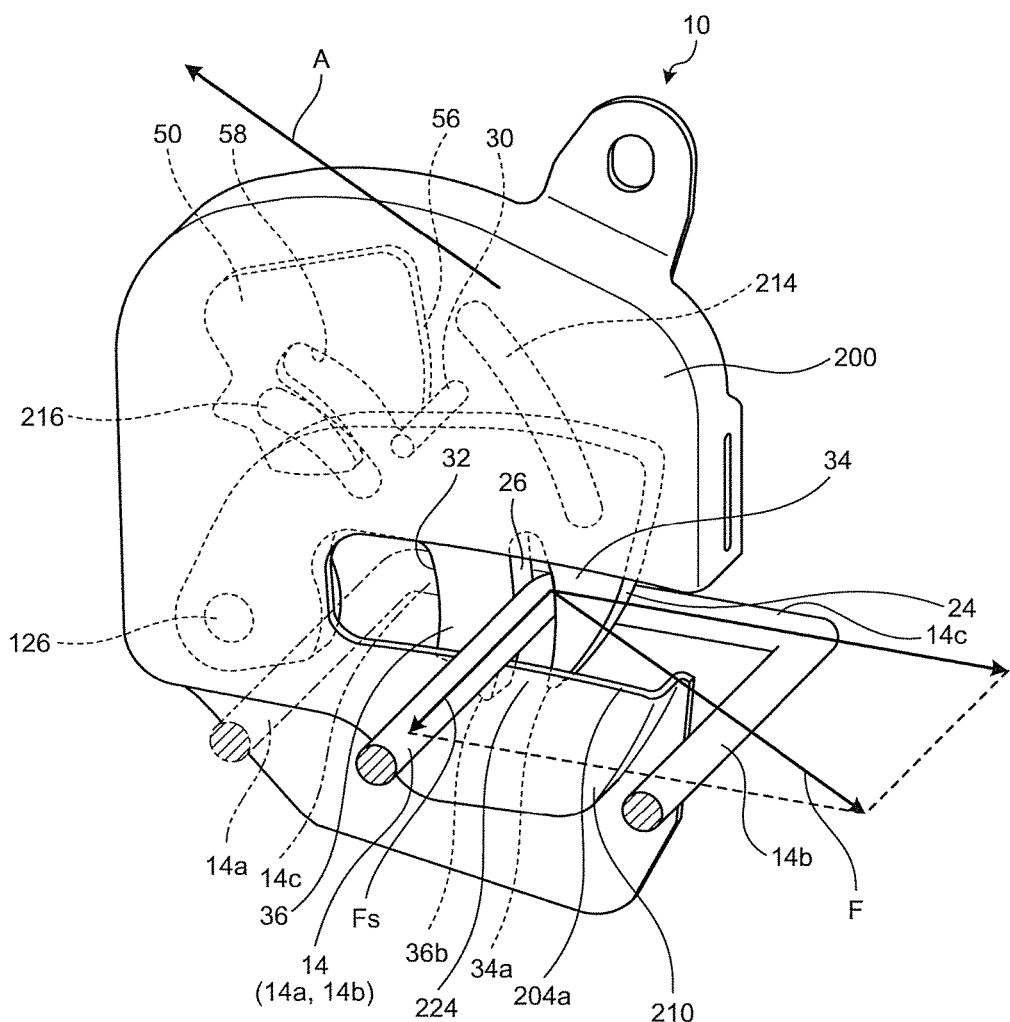
FIG. 14 is a schematic diagram illustrating operation when a load in a diagonally rearward direction acts on the seat lock apparatus.
Figure 15:
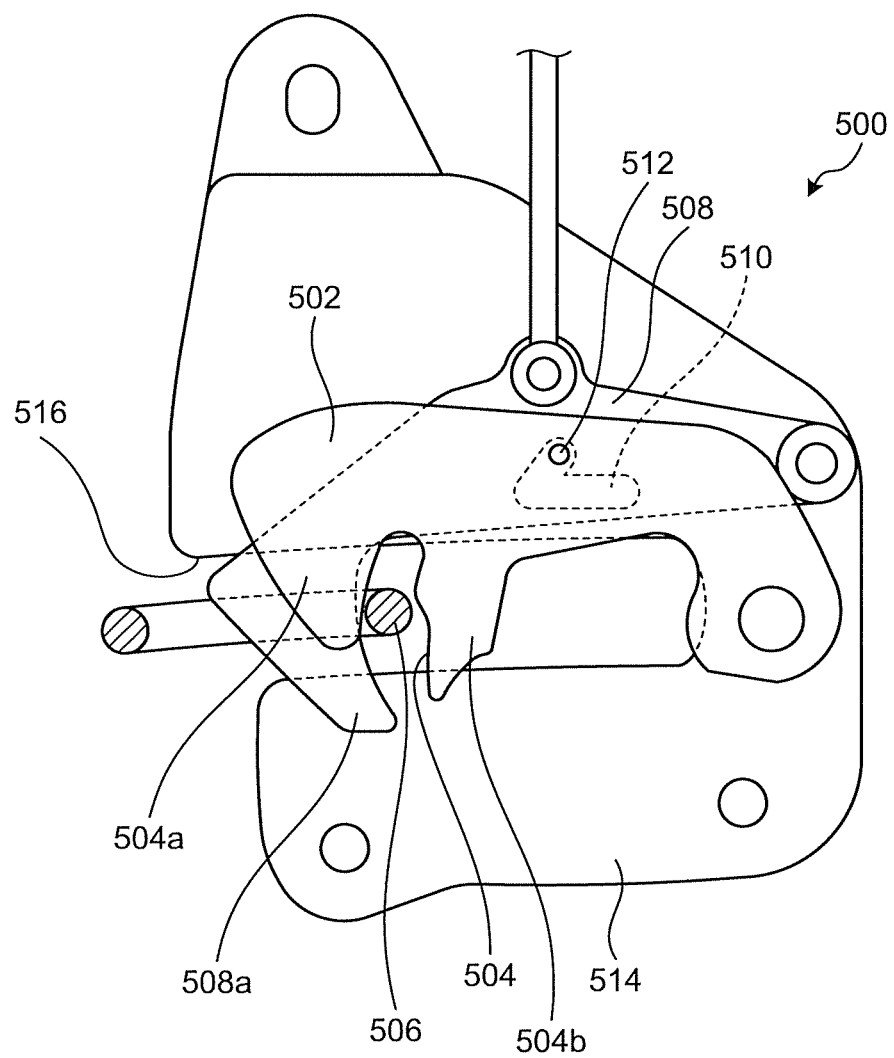
FIG. 15 is a schematic diagram of a seat lock apparatus according to a conventional technique.
Figure 16:
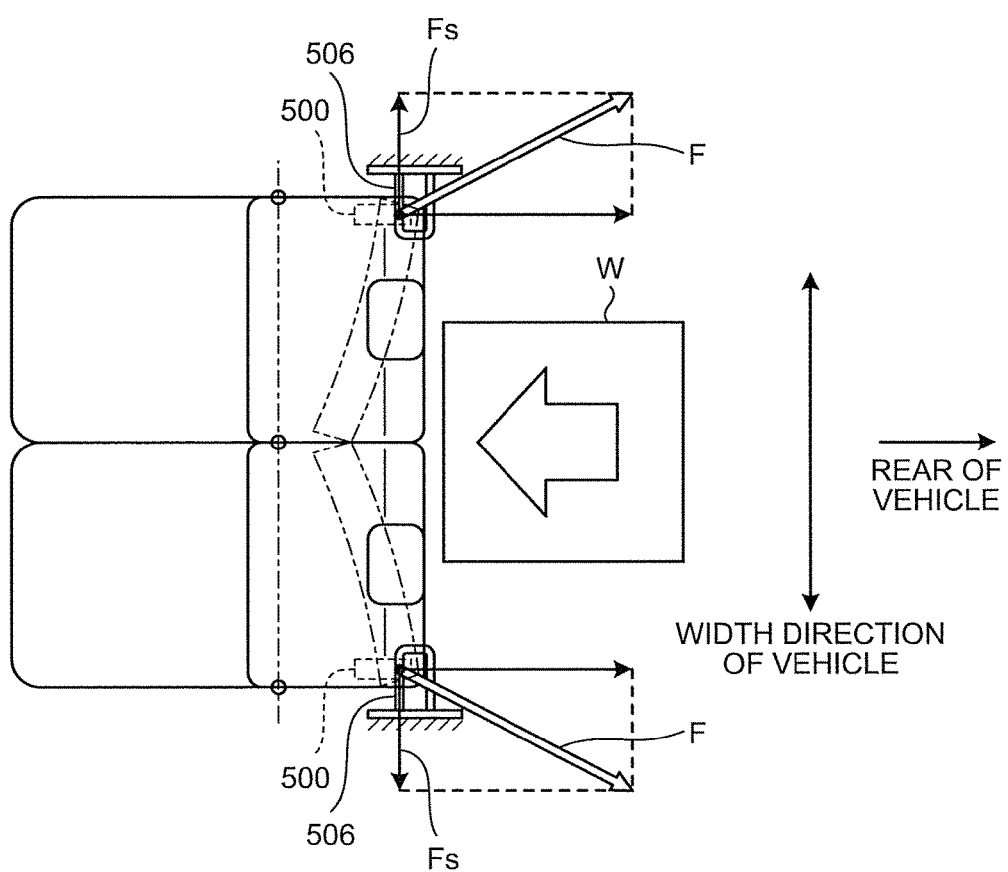
FIG. 16 is a schematic diagram illustrating a state where luggage has collided with a rear seat.

As illustrated in FIG. 14, the seat lock apparatus 10 in this case tries to be displaced in a diagonally forward direction of the vehicle as indicated with an arrow A, but since the striker 14 has been fixed, the load F acts, as a reaction thereto, in the diagonally rearward direction of the vehicle. A backward component force is supported by the first angular portion 34, but since the lateral load Fs also acts, a connected portion 14c between the first striker 14a and the second striker 14b comes into contact with a side surface of the first angular portion 34, or the first angular portion 34 starts to be displaced outward in the width direction of the vehicle (to the near side of the surface of the paper in FIG. 14) due to frictional force of the first striker 14a. Further, the hook member 20 may have rotated in the negative direction due to the impact and the interlock pin 30 may have been brought into the interlocked position where the interlock pin 30 contacts the interlock surface 56 of the cam plate 50 (see FIG. 13 and FIG. 14). The cam plate 50 has been brought into the restricting position of restricting the hook member 20 from rotating in the negative direction.

At this time, firstly, the hook member 20 comes into contact with and is accepted by the two inward bulged portions 214 and 216 that are above the striker entrance groove 204a. When the lateral load Fs is comparatively small, lateral displacement of the hook member 20 is able to be limited just by these bulged portions 214 and 216.

When the lateral load Fs is large, the hook member 20 is displaced further, and the distal end 34a of the first angular portion 34 and the distal end 36b of the second angular portion 36 that are both the end portions of the opening of the engagement groove 26 are beyond the striker entrance groove 204a to overlap the facing surface 224 of the cover member 200, and come into contact with the facing surface 224. The lateral load Fs directly acts on the first angular portion 34, but also acts on the second angular portion 36 integral with the first angular portion 34 with the engagement groove 26 interposed therebetween, the facing surface 224 is able to support the hook member 20 well-balancedly at two places, the distal end 34a and the distal end 36b, and what is more, since the cover member 200 and the hook member 20 both have adequate strength, the cover member 200 and the hook member 20 are not damaged or displaced, displacement of the hook member 20 is able to be limited infallibly, and the striker 14 is able to be prevented from coming out from the engagement groove 26.

Further, there are no other parts interposed between the distal ends 34a and 36b and the facing surface 224, and thus when the lateral load Fs is received, these distal ends 34a and 36b easily come into contact with the facing surface 224 and the lateral load Fs is easily accepted. To be increased in strength further, an edge portion of the striker entrance groove 204a, with which the distal ends 34a and 36b can come into contact, may be formed thickly, or provided with an appropriate reinforcing material.

The striker 14 illustrated with a solid line in FIG. 14 represents a case where the seat back 12b is in the standard standing posture, but when the seat back 12b is in the inclined standing posture, as illustrated with an imaginary line, the first striker 14a is loosely fitted in the loosely fitting groove 32, and the second striker 14b is engaged with the engagement groove 26. In this case, the lateral load Fs acts on the first angular portion 34 via the second striker 14b, and can also act on the second angular portion 36 via the connected portion 14c. As described above, in the inclined standing posture also, the distal ends 34a and 36b appropriately come into contact with and are supported by the facing surface 224. Further, the hook member 20 has not been necessarily displaced into the interlocked position when the impact is received from the luggage W, and may have not been displaced from the normal locked position as illustrated in FIG. 6. In this case, even if the hook member 20 receives the lateral load Fs, the distal end 34a and distal end 36b that are both the end portions of the opening of the engagement groove 26 have gone over the striker entrance groove 204a and overlapped the facing surface 224 of the cover member 200 sufficiently, and the striker 14 will not come out from the engagement groove 26.

As described above, the seat lock apparatus 10 according to this embodiment enables operability for release of the engagement between the hook member 20 and the striker 14 to be improved and rattling of the hook member 20 to be prevented. Further, the distal ends 34a and 36b that are both the end portions of the opening of the engagement groove 26 that the striker 14 engages with are configured to overlap the cover member 200 in a side view thereof. Therefore, even if impact is received from the rear due to the luggage W, the hook member 20 is brought into the interlocked position, and the lateral load Fs acts from the striker 14; at least the distal ends 34a and 36b come into contact with the facing surface 224 of the cover member 200 and displacement is limited. Therefore, the striker 14 is prevented from coming out from the hook member 20, and the seat back 12b will not be largely displaced forward.

Further, the lateral load Fs actively acts on the hook member 20 that is high in strength, and does not directly act on the cam plate 50, the sensing lever 70, and the open lever 100, and thus the cam plate 50, the sensing lever 70, and the open lever 100 are able to be formed thinly or formed of a resin material. The seat lock apparatus 10 is a two-step locking mechanism, but the above described actions and effects are also valid for a single step locking mechanism.

In a seat lock apparatus according to the disclosure, by being configured such that both of end portions of an opening of an engagement groove that a striker engages with overlap a cover member when a hook member is in an interlocked position, even if a lateral load acts from the striker, at least both of the end portions of the opening of the engagement groove come into contact with the cover member and displacement is limited. Therefore, the striker is able to be prevented from coming out from the hook member.

According to some embodiments, it becomes easy for both of the end portions of the opening of the engagement groove to come into contact with the cover member when a lateral load is received, and the lateral load is easy to be accepted.

According to some embodiments, the hook member can be accepted by the inward bulged portion.

According to some embodiments, the interlocking function of the hook member is able to be realized appropriately, and rattling of the hook member is able to be prevented.

According to some embodiments, when the striker enters, the cam plate is retained in the allowing position, the interlocking function is invalidated such that the interlock pin does not interfere with the interlock surface, and the hook member is able to be rotated properly.

According to some embodiments, the interlocking function is invalidated such that the interlock pin does not interfere with the interlock surface, and the hook member is able to be rotated properly. In this case, the same pin may be used both as the hook release pin and the interlock pin.

According to some embodiments, the operation timing is easily controlled.

According to some embodiments, when the striker enters, the hook member is able to be retained in a proper position.

According to some embodiments, the standing posture of the seat back is able to be set in two steps.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A seat lock apparatus, comprising:
   a hook member configured to be rotationally biased elastically in a positive direction;
   an interlocking unit configured to restrict rotation of the hook member in a negative direction; and
   a cover member configured to cover an operation range of the hook member at one side of the hook member, the cover member including a striker entrance groove that a striker enters, wherein
   the hook member includes:
      a support shaft provided near one end of the hook member;
      an inclined hook edge face provided at another end of the hook member, and configured to be rotationally biased in the negative direction by the entering striker coming into contact with the inclined hook edge face; and
      an engagement groove that has a depth enabling the hook member to be in a locked position by the entering striker fitting into the depth after overriding the inclined hook edge face,
   the interlocking unit is configured to be switched over:
      to a restricting position of restricting the rotation of the hook member in the negative direction when the hook member is in engagement with the striker and is in the locked position; and
      to an allowing position of allowing the rotation of the hook member in the negative direction when the striker enters and when an engagement releasing operation for the striker has been performed, and
   the engagement groove has both end portions at a side of an opening of the engagement groove, each end portion being beyond the striker entrance groove to overlap the cover member as viewed along a shaft direction of the hook member when the hook member is at a position of being restricted from operating by the interlocking unit.

2. The seat lock apparatus according to claim 1, wherein both the end portions of the opening and the cover member have no other parts interposed therebetween.

3. The seat lock apparatus according to claim 2, wherein the cover member includes an inward bulged portion configured to reduce a gap between the cover member and the hook member, over the operation range of the hook member.

4. The seat lock apparatus according to claim 1, wherein the hook member includes a restraint pin configured to protrude to a side of the hook member, and an interlock pin configured to protrude to the side of the hook member,
   the interlocking unit is a cam plate configured to be rotationally biased elastically in a positive direction, and
   the cam plate includes:
      a cam surface configured to come into contact with the restraint pin to rotationally bias the hook member in the positive direction, in the restricting position; and
      an interlock surface that the interlock pin comes into contact with before the striker comes out from the engagement groove when the hook member rotates from the locked position in the negative direction.

5. The seat lock apparatus according to claim 4, further comprising:
   a sensing lever configured to be rotationally biased elastically in a positive direction, wherein
   the sensing lever includes:
      a sensing inclined edge face configured to be rotationally biased in a negative direction by the entering striker coming into contact with the sensing inclined edge face; and
      a stopper pin configured to retain, at a side opposite to the sensing inclined edge face as viewed from a support shaft, the cam plate in the allowing position by pressing a stopper surface of the cam plate in an initial position where the striker is separate from the sensing lever,
   the cam plate includes an escape groove provided between the cam surface and the interlock surface, and
   the cam plate is configured to be retained in the allowing position by the stopper pin such that at least a part of the interlock pin goes into the escape groove when the hook member is rotated in the negative direction by the entering striker coming into contact with the inclined hook edge face.

6. The seat lock apparatus according to claim 5, wherein the stopper pin is configured to be separated from the stopper surface by rotating the sensing lever in the negative direction by the entering striker coming into contact with the sensing inclined edge face, and the cam surface is caused to come into contact with the restraint pin by the cam plate being rotated in the positive direction from the allowing position when the stopper pin is separated from the stopper surface.

7. The seat lock apparatus according to claim 5, further comprising:
   an open lever configured to be rotationally biased elastically in a negative direction, wherein
   the open lever includes:
      a hook release lever configured to rotate the hook member in the negative direction until the striker comes out from the engagement groove, by pressing a hook release pin provided in the hook member while slidingly contacting the hook release pin, when the open lever is rotated in a positive direction by a force received from an operation portion; and
      a cam release lever surface configured to rotate the cam plate up to the allowing position in a negative direction by pressing a cam release pin provided in the cam plate while slidingly contacting the cam release pin, and the cam plate is configured to rotate into the allowing position such that at least a part of the interlock pin goes into the escape groove, when the open lever is rotated in the positive direction and the hook member is rotated in the negative direction.

8. The seat lock apparatus according to claim 7, wherein the open lever includes a cam holding curved surface formed continuously from an end portion of the cam release lever surface, the cam holding curved surface being configured to retain the cam plate in the allowing position while slidingly contacting the cam release pin, and when the open lever is rotated in the positive direction, the hook release lever is configured to come into contact with the hook release pin belatedly after the cam release lever surface comes into contact with the cam release pin, and the cam plate is configured to rotate prior to the hook member to be retained in the allowing position.

9. The seat lock apparatus according to claim 1, wherein when the striker is in a disengaged state, rotation of the hook member in the positive direction is restricted by at least one of the end portions of the opening coming into contact with a part of the cover member.

10. The seat lock apparatus according to claim 1, wherein the striker is a first striker, and the first striker is configured to operate integrally and in association with a second striker that is separate from the first striker by a prescribed distance, the hook member includes a loosely fitting groove between the engagement groove and the support shaft, and when the first striker, which has been come out from the engagement groove by rotating the hook member in the negative direction based on an operation of an operator, goes into the loosely fitting groove by further entrance of the first striker and the second striker reaches an entrance portion of the engagement groove, the hook member is configured to return in the positive direction to: loosely fit the first striker into the loosely fitting groove; and engage the second striker with the engagement groove.

* * * * *